United States Patent
Song et al.

(10) Patent No.: US 11,630,781 B2
(45) Date of Patent: Apr. 18, 2023

(54) CACHE METADATA MANAGEMENT

(71) Applicant: Micron Technology, Inc., Boise, ID (US)

(72) Inventors: Taeksang Song, San Jose, CA (US); Akhila Gundu, San Jose, CA (US); Kimberly Judy Lobo, San Jose, CA (US); Chinnakrishnan Ballapuram, San Jose, CA (US); Saira S. Malik, Lafayette, IN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/349,621

(22) Filed: Jun. 16, 2021

(65) Prior Publication Data

US 2021/0397561 A1    Dec. 23, 2021

Related U.S. Application Data

(60) Provisional application No. 63/042,951, filed on Jun. 23, 2020.

(51) Int. Cl.
*G06F 12/0891* (2016.01)
*G06F 12/0831* (2016.01)
*G06F 13/16* (2006.01)
*G06F 12/126* (2016.01)

(52) U.S. Cl.
CPC ...... *G06F 12/0891* (2013.01); *G06F 12/0833* (2013.01); *G06F 12/126* (2013.01); *G06F 13/1673* (2013.01); *G06F 2212/466* (2013.01)

(58) Field of Classification Search
None
See application file for complete search history.

(56) References Cited

U.S. PATENT DOCUMENTS

2005/0071601 A1* 3/2005 Luick ................. G06F 12/0862
  711/216
2010/0257319 A1* 10/2010 Usui ..................... G06F 12/084
  711/E12.001

* cited by examiner

*Primary Examiner* — Charles J Choi
(74) *Attorney, Agent, or Firm* — Holland & Hart, LLP

(57) ABSTRACT

Methods, systems, and devices for cache metadata management in a memory subsystem are described. The memory subsystem may include an interface controller coupled with a non-volatile memory and a volatile memory. The interface controller may use metadata, such as validity information and dirty information, to operate the volatile memory as cache. The interface controller may store the dirty information in the volatile memory and may store the validity information in an array in the interface controller.

25 Claims, 10 Drawing Sheets

CACHE METADATA MANAGEMENT

CROSS REFERENCE

The present application for patent claims the benefit of U.S. Provisional Patent Application No. 63/042,951 by SONG et al., entitled "CACHE METADATA MANAGEMENT," filed Jun. 23, 2020, assigned to the assignee hereof, and expressly incorporated by reference herein.

BACKGROUND

The following relates generally to one or more memory systems and more specifically to cache metadata management in a memory subsystem.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
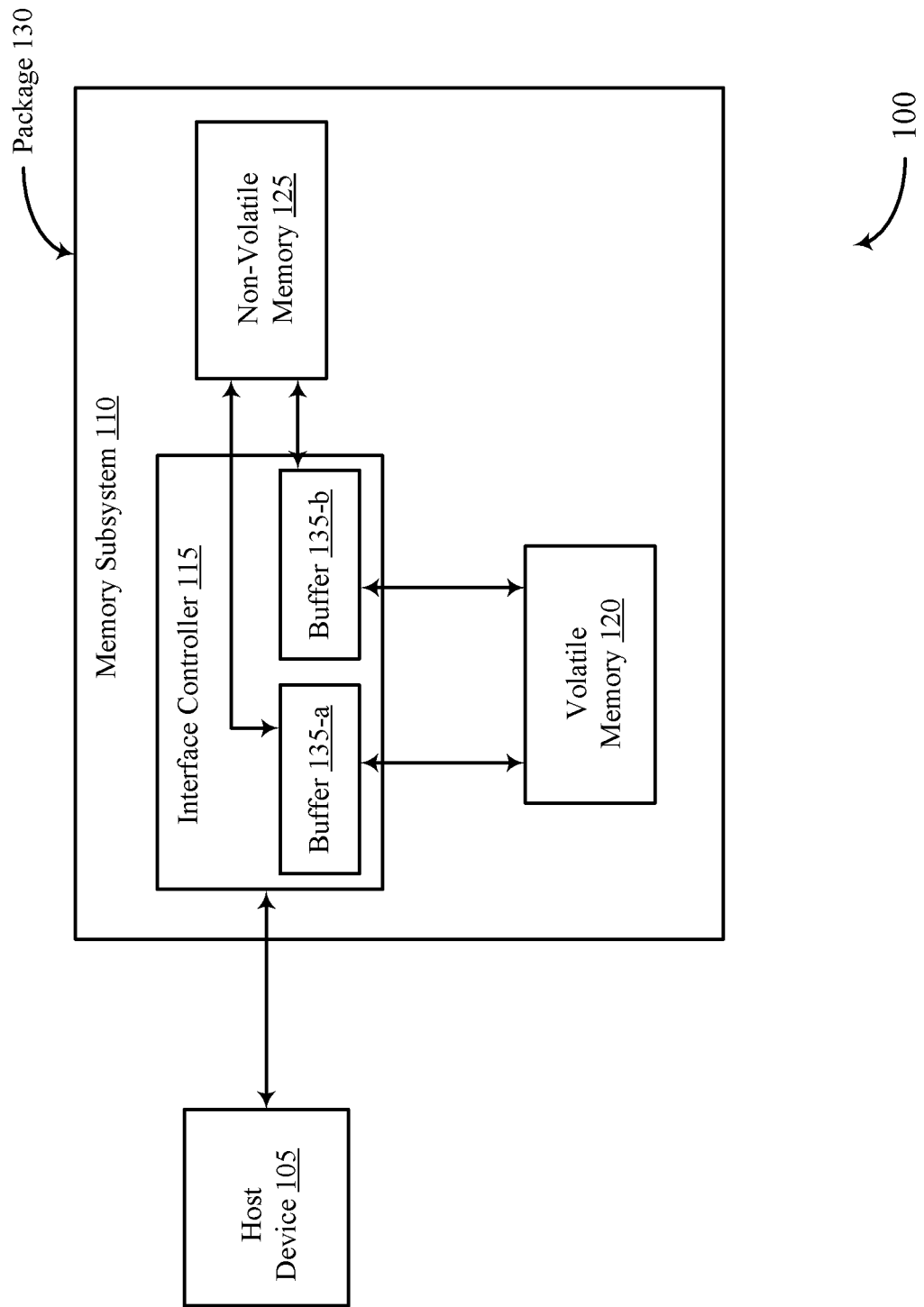
FIG. 1 illustrates an example of a system that supports cache metadata management in accordance with examples as disclosed herein.

A device, such as an electronic device, may include a main memory (e.g., a primary memory for storing information among other operations) and a secondary memory that may operate as a cache. To operate the secondary memory as a cache, the device may use metadata that indicates the status of data in one or more portions of the secondary memory. For example, the device may use validity information that indicates whether the data stored in a portion of memory is actual data (e.g., data previously written to the portion) or garbage data (e.g., data such as random data stored by the portion upon initialization, start-up, reset, or some other procedure). The device may also use dirty information that indicates whether the data stored in a portion of the memory has been modified since it was stored in main memory or is missing from main memory altogether.

In some examples, a device that uses metadata to manage a cache may store the metadata in a separate location, such as a separate array. But storing the metadata in a separate array may be impractical if the size of the cache results in an amount of metadata that consumes a high percentage of or exceeds the storage capacity of the array. In an alternative, a device may store the metadata for a cache in the cache itself. But storing the metadata in the cache may negatively impact latency and increase bandwidth consumption of the cache, among other issues. For example, the latency of retrieving data from the cache may be increased (e.g., doubled) relative to other metadata storage techniques because two read operations are performed on the cache when there is a cache hit—one read operation may be performed to determine that requested data is in the cache and another read operation may be performed again to retrieve the data. Similarly, the bandwidth consumption of the cache is increased because both metadata and data are transferred from the cache in the event of a cache hit.

According to the techniques described herein, a device may store an amount of metadata, such as a relatively large amount of metadata (e.g., relative to the size of an array)—and preserve latency and bandwidth parameters for the cache—by splitting the storage of metadata between the cache and an array. In some examples, the storage of the metadata may be split based on the type of metadata. For example, the device may store dirty information in the cache and validity information in the array. Storing dirty information in the cache may free up memory cells in the array for other information related to cache management. And storing validity information in the array may reduce cache latency and bandwidth consumption by reducing the number of times the cache is read during a retrieval operation. In some examples, the metadata stored in the array or the cache may be updated by a masked write operation, which may reduce latency and power consumption relative to other update schemes (e.g., read-modify-write schemes).

Features of the disclosure are initially described in the context of a memory system and subsystem as described with reference to FIGS. 1 and 2. Features of the disclosure are described in the context of a device, as described with reference to FIG. 3, process flows, as described with reference to FIGS. 4 through 6, and a volatile memory row, as described with reference to FIG. 7. These and other features of the disclosure are further illustrated by and described with reference to an apparatus diagram and flowcharts that relate to cache metadata management as described with reference to FIGS. 8-10.

FIG. 1 illustrates an example of a memory system 100 that supports cache management in a memory subsystem in accordance with examples as disclosed herein. The memory system 100 may be included in an electronic device such a computer or phone. The memory system 100 may include a host device 105 and a memory subsystem 110. The host device 105 may be a processor or system-on-a-chip (SoC) that interfaces with the interface controller 115 as well as other components of the electronic device that includes the memory system 100. The memory subsystem 110 may store and provide access to electronic information (e.g., digital information, data) for the host device 105. The memory subsystem 110 may include an interface controller 115, a volatile memory 120, and a non-volatile memory 125. In some examples, the interface controller 115, the volatile memory 120, and the non-volatile memory 125 may be included in a same physical package such as a package 130. However, the interface controller 115, the volatile memory 120, and the non-volatile memory 125 may be disposed on different, respective dies (e.g., silicon dies).

The devices in the memory system 100 may be coupled by various conductive lines (e.g., traces, printed circuit board (PCB) routing, redistribution layer (RDL) routing) that may enable the communication of information (e.g., commands, addresses, data) between the devices. The conductive lines may make up channels, data buses, command buses, address buses, and the like.

The memory subsystem 110 may be configured to provide the benefits of the non-volatile memory 125 while maintaining compatibility with a host device 105 that supports protocols for a different type of memory, such as the volatile memory 120, among other examples. For example, the non-volatile memory 125 may provide benefits (e.g., relative to the volatile memory 120) such as non-volatility, higher capacity, or lower power consumption. But the host device 105 may be incompatible or inefficiently configured with various aspects of the non-volatile memory 125. For instance, the host device 105 may support voltages, access latencies, protocols, page sizes, etc. that are incompatible with the non-volatile memory 125. To compensate for the incompatibility between the host device 105 and the non-volatile memory 125, the memory subsystem 110 may be configured with the volatile memory 120, which may be compatible with the host device 105 and serve as a cache for the non-volatile memory 125. Thus, the host device 105 may use protocols supported by the volatile memory 120 while benefitting from the advantages of the non-volatile memory 125.

In some examples, the memory system 100 may be included in, or coupled with, a computing device, electronic device, mobile computing device, or wireless device. The device may be a portable electronic device. For example, the device may be a computer, a laptop computer, a tablet computer, a smartphone, a cellular phone, a wearable device, an internet-connected device, or the like. In some examples, the device may be configured for bi-directional wireless communication via a base station or access point. In some examples, the device associated with the memory system 100 may be capable of machine-type communication (MTC), machine-to-machine (M2M) communication, or device-to-device (D2D) communication. In some examples, the device associated with the memory system 100 may be referred to as a user equipment (UE), station (STA), mobile terminal, or the like.

The host device 105 may be configured to interface with the memory subsystem 110 using a first protocol (e.g., low-power double data rate (LPDDR)) supported by the interface controller 115. Thus, the host device 105 may, in some examples, interface with the interface controller 115 directly and the non-volatile memory 125 and the volatile memory 120 indirectly. In alternative examples, the host device 105 may interface directly with the non-volatile memory 125 and the volatile memory 120. The host device 105 may also interface with other components of the electronic device that includes the memory system 100. The host device 105 may be or include an SoC, a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In some examples, the host device 105 may be referred to as a host.

The interface controller 115 may be configured to interface with the volatile memory 120 and the non-volatile memory 125 on behalf of the host device 105 (e.g., based on one or more commands or requests issued by the host device 105). For instance, the interface controller 115 may facilitate the retrieval and storage of data in the volatile memory 120 and the non-volatile memory 125 on behalf of the host device 105. Thus, the interface controller 115 may facilitate data transfer between various subcomponents, such as between at least some of the host device 105, the volatile memory 120, or the non-volatile memory 125. The interface controller 115 may interface with the host device 105 and the volatile memory 120 using the first protocol and may interface with the non-volatile memory 125 using a second protocol supported by the non-volatile memory 125.

The non-volatile memory 125 may be configured to store digital information (e.g., data) for the electronic device that includes the memory system 100. Accordingly, the non-volatile memory 125 may include an array or arrays of memory cells and a local memory controller configured to operate the array(s) of memory cells. In some examples, the memory cells may be or include FeRAM cells (e.g., the non-volatile memory 125 may be FeRAM). The non-volatile memory 125 may be configured to interface with the interface controller 115 using the second protocol that is different than the first protocol used between the interface controller 115 and the host device 105. In some examples, the non-volatile memory 125 may have a longer latency for access operations than the volatile memory 120. For example, retrieving data from the non-volatile memory 125 may take longer than retrieving data from the volatile memory 120. Similarly, writing data to the non-volatile memory 125 may take longer than writing data to the volatile memory 120. In some examples, the non-volatile memory 125 may have a smaller page size than the volatile memory 120, as described herein.

The volatile memory 120 may be configured to operate as a cache for one or more components, such as the non-volatile memory 125. For example, the volatile memory 120 may store information (e.g., data) for the electronic device that includes the memory system 100. Accordingly, the volatile memory 120 may include an array or arrays of memory cells and a local memory controller configured to operate the array(s) of memory cells. In some examples, the memory cells may be or include DRAM cells (e.g., the volatile memory may be DRAM). The non-volatile memory 125 may be configured to interface with the interface controller 115 using the first protocol that is used between the interface controller 115 and the host device 105.

In some examples, the volatile memory 120 may have a shorter latency for access operations than the non-volatile memory 125. For example, retrieving data from the volatile memory 120 may take less time than retrieving data from the non-volatile memory 125. Similarly, writing data to the volatile memory 120 may take less time than writing data to the non-volatile memory 125. In some examples, the volatile memory 120 may have a larger page size than the non-volatile memory 125. For instance, the page size of volatile memory 120 may be 2 kilobytes (2 kB) and the page size of non-volatile memory 125 may be 64 bytes (64 B) or 128 bytes (128 B).

Although the non-volatile memory 125 may be a higher-density memory than the volatile memory 120, accessing the non-volatile memory 125 may take longer than accessing the volatile memory 120 (e.g., due to different architectures and protocols, among other reasons). Accordingly, operating the volatile memory 120 as a cache may reduce latency in the memory system 100. As an example, an access request for data from the host device 105 may be satisfied relatively quickly by retrieving the data from the volatile memory 120 rather than from the non-volatile memory 125. To facilitate operation of the volatile memory 120 as a cache, the interface controller 115 may include multiple buffers 135. The buffers 135 may be disposed on the same die as the interface controller 115 and may be configured to temporarily store data for transfer between the volatile memory 120, the non-volatile memory 125, or the host device 105 (or any combination thereof) during one or more access operations (e.g., storage and retrieval operations).

An access operation may also be referred to as an access process or access procedure and may involve one or more sub-operations that are performed by one or more of the components of the memory subsystem 110. Examples of access operations may include storage operations in which data provided by the host device 105 is stored (e.g., written to) in the volatile memory 120 or the non-volatile memory 125 (or both), and retrieval operations in which data requested by the host device 105 is obtained (e.g., read) from the volatile memory 120 or the non-volatile memory 125 and is returned to the host device 105.

To store data in the memory subsystem 110, the host device 105 may initiate a storage operation (or "storage process") by transmitting a storage command (also referred to as a storage request, a write command, or a write request) to the interface controller 115. The storage command may target a set of non-volatile memory cells in the non-volatile memory 125. In some examples, a set of memory cells may also be referred to as a portion of memory. The host device 105 may also provide the data to be written to the set of non-volatile memory cells to the interface controller 115. The interface controller 115 may temporarily store the data in the buffer 135-a. After storing the data in the buffer 135-a, the interface controller 115 may transfer the data from the buffer 135-a to the volatile memory 120 or the non-volatile memory 125 or both. In write-through mode, the interface controller 115 may transfer the data to both the volatile memory 120 and the non-volatile memory 125. In write-back mode, the interface controller 115 may only transfer the data to the volatile memory 120.

In either mode, the interface controller 115 may identify an appropriate set of one or more volatile memory cells in the volatile memory 120 for storing the data associated with the storage command. To do so, the interface controller 115 may implement set-associative mapping in which each set (e.g., block) of one or more non-volatile memory cells in the non-volatile memory 125 may be mapped to multiple sets of volatile memory cells in the volatile memory 120. For instance, the interface controller 115 may implement n-way associative mapping which allows data from a set of non-volatile memory cells to be stored in one of n sets of volatile memory cells in the volatile memory 120. Thus, the interface controller 115 may manage the volatile memory 120 as a cache for the non-volatile memory 125 by referencing the n sets of volatile memory cells associated with a targeted set of non-volatile memory cells. As used herein, a "set" of objects may refer to one or more of the objects unless otherwise described or noted. Although described with reference to set-associative mapping, the interface controller 115 may manage the volatile memory 120 as a cache by implementing one or more other types of mapping such as direct mapping or associative mapping, among other examples.

After determining which n sets of volatile memory cells are associated with the targeted set of non-volatile memory cells, the interface controller 115 may store the data in one or more of the n sets of volatile memory cells. This way, a subsequent retrieval command from the host device 105 for the data can be efficiently satisfied by retrieving the data from the lower-latency volatile memory 120 instead of retrieving the data from the higher-latency non-volatile memory 125. The interface controller 115 may determine which of then sets of the volatile memory 120 to store the data based on one or more parameters associated with the data stored in the n sets of the volatile memory 120, such as the validity, age, or modification status of the data. Thus, a storage command by the host device 105 may be wholly (e.g., in write-back mode) or partially (e.g., in write-through mode) satisfied by storing the data in the volatile memory 120. To track the data stored in the volatile memory 120, the interface controller 115 may store for one or more sets of volatile memory cells (e.g., for each set of volatile memory cells) a tag address that indicates the non-volatile memory cells with data stored in a given set of volatile memory cells.

To retrieve data from the memory subsystem 110, the host device 105 may initiate a retrieval operation (also referred to as a retrieval process) by transmitting a retrieval command (also referred to as a retrieval request, a read command, or a read request) to the interface controller 115. The retrieval command may target a set of one or more non-volatile memory cells in the non-volatile memory 125. Upon receiving the retrieval command, the interface controller 115 may check for the requested data in the volatile memory 120. For instance, the interface controller 115 may check for the requested data in the n sets of volatile memory cells associated with the targeted set of non-volatile memory cells. If one of the n sets of volatile memory cells stores the requested data (e.g., stores data for the targeted set of non-volatile memory cells), the interface controller 115 may transfer the data from the volatile memory 120 to the buffer 135-a (e.g., in response to determining that one of the n sets of volatile memory cells stores the requested data) so that it can be transmitted to the host device 105. The term "hit" may be used to refer to the scenario where the volatile memory 120 stores data requested by the host device 105. If then sets of one or more volatile memory cells do not store the requested data (e.g., the n sets of volatile memory cells store data for a set of non-volatile memory cells other than the targeted set of non-volatile memory cells), the interface controller 115 may transfer the requested data from the non-volatile memory 125 to the buffer 135-a (e.g., in response to determining that the n sets of volatile memory cells do not store the requested data) so that it can be transmitted to the host device 105. The term "miss" may be used to refer to the scenario where the volatile memory 120 does not store data requested by the host device 105.

In a miss scenario, after transferring the requested data to the buffer 135-a, the interface controller 115 may transfer the requested data from the buffer 135-*a* to the volatile memory 120 so that subsequent read requests for the data can be satisfied by the volatile memory 120 instead of the non-volatile memory 125. For example, the interface controller 115 may store the data in one of the n sets of volatile memory cells associated with the targeted set of non-volatile memory cells. But the n sets of volatile memory cells may already be storing data for other sets of non-volatile memory cells. So, to preserve this other data, the interface controller 115 may transfer the other data to the buffer 135-*b* so that it can be transferred to the non-volatile memory 125 for storage. Such a process may be referred to as "eviction" and the data transferred from the volatile memory 120 to the buffer 135-*b* may be referred to as "victim" data. In some examples, the interface controller 115 may transfer a subset of the victim data from the buffer 135-*b* to the non-volatile memory 125. For example, the interface controller 115 may transfer one or more subsets of victim data that have changed since the data was initially stored in the non-volatile memory 125. Data that is inconsistent between the volatile memory 120 and the non-volatile memory 125 (e.g., due to an update in one memory and not the other) may be referred to in some examples as "modified" or "dirty" data. In some examples (e.g., when interface controller operates in one mode such as a write-back mode), dirty data may be data that is present in the volatile memory 120 but not present in the non-volatile memory 125.

In some examples, the interface controller 115 may operate the volatile memory 120 as a cache based on metadata that provides information about the data stored in the volatile memory 120. For example, the interface controller 115 may use metadata such as validity information or dirty information, among other examples, to manage the volatile memory 120 as a cache. Validity information may include information that indicates whether data stored in the volatile memory 120 is actual data (e.g., data stored in the volatile memory 120 based on a command from the host device 105) or garbage data (e.g., data unintentionally stored or stored as a placeholder in the volatile memory 120 upon initialization, start-up, or some other procedure). Thus, the interface controller 115 may determine a cache hit or miss by referencing validity information for the volatile memory 120. Dirty information may include information that indicates whether data stored in the volatile memory 120 is inconsistent with data stored in the non-volatile memory 125. For example, dirty information may indicate whether data stored in the volatile memory 120 1) has been modified since it was stored in the non-volatile memory 125 (which may occur in write-through mode) or 2) is absent from the non-volatile memory 125 (which may occur in write-back mode).

In some examples, the memory subsystem 110 may store validity information and dirty information in an array included in the interface controller 115. But this storage technique may be impractical if the size (e.g., storage capacity, quantity of addressable memory cells) of the volatile memory 120 results in an amount of validity information and dirty information that exceeds (or disproportionately consumes) the storage capacity of the array, among other issues. Alternatively, the memory subsystem 110 may store validity information and dirty information in the volatile memory 120. But this storage technique may negatively impact the latency or bandwidth of the memory subsystem 110, among other issues. For example, in the event of a cache hit, the volatile memory may be accessed twice (e.g., once to read the validity information and again to read the requested data), which may increase the latency of retrieving data. Also, validity information may be transferred from the volatile memory 120 in addition to the requested data, which may consume additional bandwidth (e.g., pins on a bus).

According to the techniques described herein, the memory subsystem 110 may conserve array resources and increase the efficiency of cache retrieval operations, among other advantages, by storing validity information in the array and dirty information in the volatile memory 120. Storing dirty information in the volatile memory 120 may conserve array resources by freeing up memory cells for other information. And storing validity information in the array may increase the efficiency of cache retrieval operations by eliminating the need to access the volatile memory 120 twice in the event of a cache hit.

In some examples, validity information may be referred to herein as validity flags, validity bits, or other suitable terminology. Similarly, dirty information may be referred to herein as dirty flags, dirty bits, or other suitable terminology.

Figure 2:
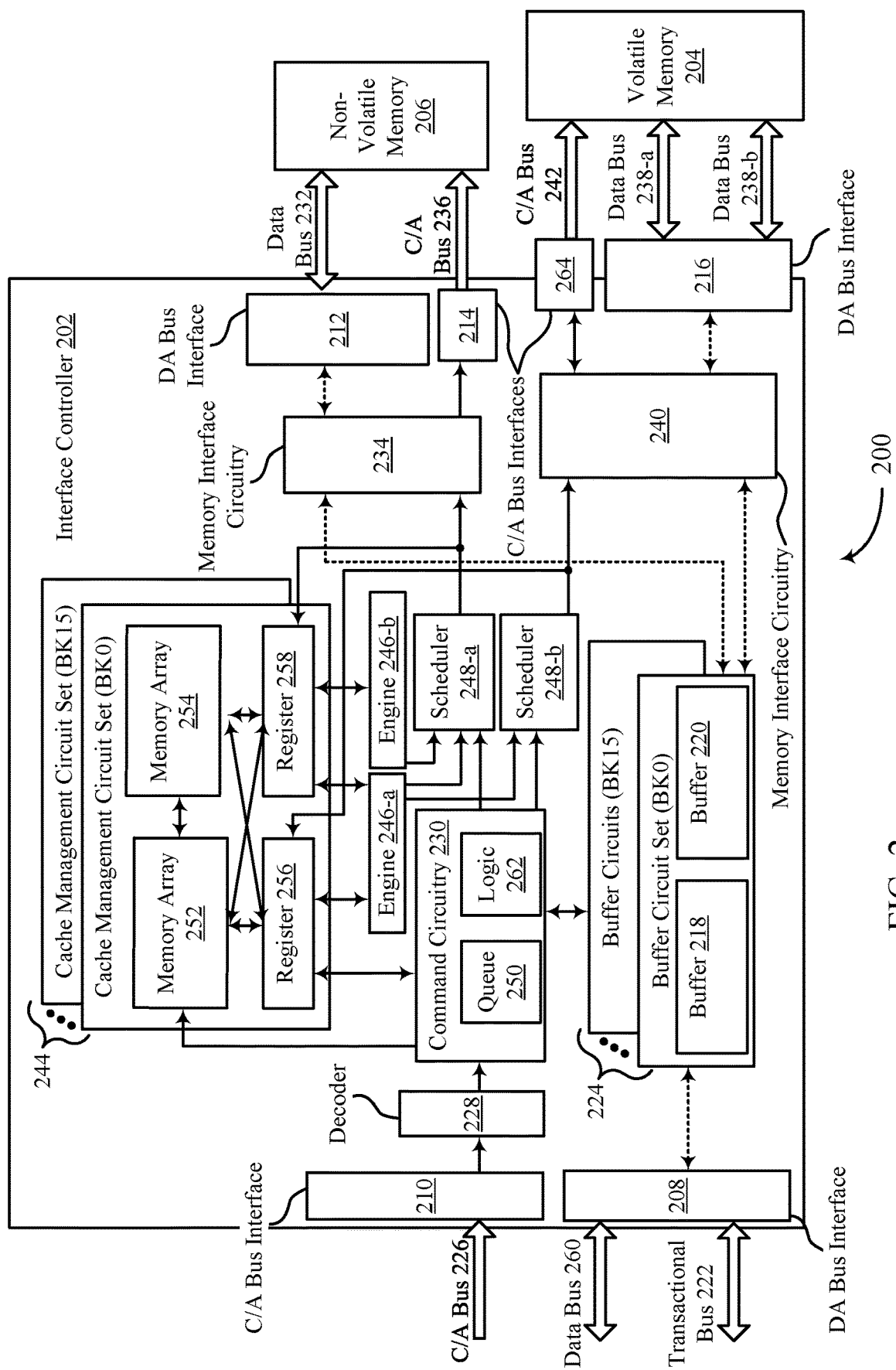
FIG. 2 illustrates an example of a memory subsystem that supports cache metadata management in accordance with examples as disclosed herein.

FIG. 2 illustrates an example of a memory subsystem 200 that supports cache management in a memory subsystem in accordance with examples as disclosed herein. The memory subsystem 200 may be an example of the memory subsystem 110 described with reference to FIG. 1. Accordingly, the memory subsystem 200 may interact with a host device as described with reference to FIG. 1. The memory subsystem 200 may include an interface controller 202, a volatile memory 204, and a non-volatile memory 206, which may be examples of the interface controller 115, the volatile memory 120, and the non-volatile memory 125, respectively, as described with reference to FIG. 1. Thus, the interface controller 202 may interface with the volatile memory 204 and the non-volatile memory 206 on behalf of the host device as described with reference to FIG. 1. For example, the interface controller 202 may operate the volatile memory 204 as a cache for the non-volatile memory 206. Operating the volatile memory 204 as the cache may allow subsystem to provide the benefits of the non-volatile memory 206 (e.g., non-volatile, high-density storage) while maintaining compatibility with a host device that supports a different protocol than the non-volatile memory 206.

In FIG. 2, dashed lines between components represent the flow of data or communication paths for data and solid lines between components represent the flow of commands or communication paths for commands. In some examples, the memory subsystem 200 is one of multiple similar or identical subsystems that may be included in an electronic device. Each subsystem may be referred to as a slice and may be associated with a respective channel of a host device in some examples.

The non-volatile memory 206 may be configured to operate as a main memory (e.g., memory for long-term data storage) for a host device. In some examples, the non-volatile memory 206 may include one or more arrays of FeRAM cells. Each FeRAM cell may include a selection component and a ferroelectric capacitor and may be accessed by applying appropriate voltages to one or more access lines such as word lines, plates lines, and digit lines. In some examples, a subset of FeRAM cells coupled with to an activated word line may be sensed, for example concurrently or simultaneously, without having to sense all FeRAM cells coupled with the activated word line. Accordingly, a page size for an FeRAM array may be different than (e.g., smaller than) a DRAM page size. In the context of a memory device, a page may refer to the memory cells in a row (e.g., a group of the memory cells that have a common row address) and a page size may refer to the number of memory cells or column addresses in a row, or the number of column addresses accessed during an access operation. Alternatively, a page size may refer to a size of data handled by various interfaces. In some examples, different memory device types may have different page sizes. For example, a DRAM page size (e.g., 2 kB) may be a superset of a non-volatile memory (e.g., FeRAM) page size (e.g., 64 B).

A smaller page size of an FeRAM array may provide various efficiency benefits, as an individual FeRAM cell may require more power to read or write than an individual DRAM cell. For example, a smaller page size for an FeRAM array may facilitate effective energy usage because a smaller number of FeRAM cells may be activated when an associated change in information is minor. In some examples, the page size for an array of FeRAM cells may vary, for example dynamically (e.g., during operation of the array of FeRAM cells) depending on the nature of data and command utilizing FeRAM operation.

Although an individual FeRAM cell may require more power to read or write than an individual DRAM cell, an FeRAM cell may maintain its stored logic state for an extended period of time in the absence of an external power source, as the ferroelectric material in the FeRAM cell may maintain a non-zero electric polarization in the absence of an electric field.

Therefore, including an FeRAM array in the non-volatile memory 206 may provide efficiency benefits relative to volatile memory cells (e.g., DRAM cells in the volatile memory 204), as it may reduce or eliminate requirements to perform refresh operations.

The volatile memory 204 may be configured to operate as a cache for the non-volatile memory 206. In some examples, the volatile memory 204 may include one or more arrays of DRAM cells. Each DRAM cell may include a capacitor that includes a dielectric material to store a charge representative of the programmable state. The memory cells of the volatile memory 204 may be logically grouped or arranged into one or more memory banks (as referred to herein as "banks"). For example, volatile memory 204 may include sixteen banks. The memory cells of a bank may be arranged in a grid or an array of intersecting columns and rows and each memory cell may be accessed or refreshed by applying appropriate voltages to the digit line (e.g., column line) and word line (e.g., row line) for that memory cell. The rows of a bank may be referred to pages, and the page size may refer to the number of columns or memory cells in a row. As noted, the page size of the volatile memory 204 may be different than (e.g., larger than) the page size of the non-volatile memory 206.

The interface controller 202 may include various circuits for interfacing (e.g., communicating) with other devices, such as a host device, the volatile memory 204, and the non-volatile memory 206. For example, the interface controller 202 may include a data (DA) bus interface 208, a command and address (C/A) bus interface 210, a data bus interface 212, a C/A bus interface 214, a data bus interface 216, and a C/A bus interface 264. The data bus interfaces may support the communication of information using one or more communication protocols. For example, the data bus interface 208, the C/A bus interface 210, the data bus interface 216, and the C/A bus interface 264 may support information that is communicated using a first protocol (e.g., LPDDR signaling), whereas the data bus interface 212 and the C/A bus interface 214 may support information communicated using a second protocol. Thus, the various bus interfaces coupled with the interface controller 202 may support different amounts of data or data rates.

The data bus interface 208 may be coupled with the data bus 260, the transactional bus 222, and the buffer circuitry 224. The data bus interface 208 may be configured to transmit and receive data over the data bus 260 and control information (e.g., acknowledgements/negative acknowledgements) or metadata over the transactional bus 222. The data bus interface 208 may also be configured to transfer data between the data bus 260 and the buffer circuitry 224. The data bus 260 and the transactional bus 222 may be coupled with the interface controller 202 and the host device such that a conductive path is established between the interface controller 202 and the host device. In some examples, the pins of the transactional bus 222 may be referred to as data mask inversion (DMI) pins. Although shown with one data bus 260 and one transactional bus 222, there may be any number of data buses 260 and any number of transactional buses 222 coupled with one or more data bus interfaces 208.

The C/A bus interface 210 may be coupled with the C/A bus 226 and the decoder 228. The C/A bus interface 210 may be configured to transmit and receive commands and addresses over the C/A bus 226. The commands and addresses received over the C/A bus 226 may be associated with data received or transmitted over the data bus 260. The C/A bus interface 210 may also be configured to transmit commands and addresses to the decoder 228 so that the decoder 228 can decode the commands and relay the decoded commands and associated addresses to the command circuitry 230.

The data bus interface 212 may be coupled with the data bus 232 and the memory interface circuitry 234. The data bus interface 212 may be configured to transmit and receive data over the data bus 232, which may be coupled with the non-volatile memory 206. The data bus interface 212 may also be configured to transfer data between the data bus 232 and the memory interface circuitry 234. The C/A bus interface 214 may be coupled with the C/A bus 236 and the memory interface circuitry 234. The C/A bus interface 214 may be configured to receive commands and addresses from the memory interface circuitry 234 and relay the commands and the addresses to the non-volatile memory 206 (e.g., to a local controller of the non-volatile memory 206) over the C/A bus 236. The commands and the addresses transmitted over the C/A bus 236 may be associated with data received or transmitted over the data bus 232. The data bus 232 and the C/A bus 236 may be coupled with the interface controller 202 and the non-volatile memory 206 such that conductive paths are established between the interface controller 202 and the non-volatile memory 206.

The data bus interface 216 may be coupled with the data buses 238 and the memory interface circuitry 240. The data bus interface 216 may be configured to transmit and receive data over the data buses 238, which may be coupled with the volatile memory 204. The data bus interface 216 may also be configured to transfer data between the data buses 238 and the memory interface circuitry 240. The C/A bus interface 264 may be coupled with the C/A bus 242 and the memory interface circuitry 240. The C/A bus interface 264 may be configured to receive commands and addresses from the memory interface circuitry 240 and relay the commands and the addresses to the volatile memory 204 (e.g., to a local controller of the volatile memory 204) over the C/A bus 242. The commands and addresses transmitted over the C/A bus 242 may be associated with data received or transmitted over the data buses 238. The data bus 238 and the C/A bus 242 may be coupled with the interface controller 202 and the volatile memory 204 such that conductive paths are established between the interface controller 202 and the volatile memory 204.

In addition to buses and bus interfaces for communicating with coupled devices, the interface controller 202 may include circuitry for operating the non-volatile memory 206 as a main memory and the volatile memory 204 as a cache. For example, the interface controller 202 may include command circuitry 230, buffer circuitry 224, cache management circuitry 244, one or more engines 246, and one or more schedulers 248.

The command circuitry 230 may be coupled with the buffer circuitry 224, the decoder 228, the cache management circuitry 244, and the schedulers 248, among other components. The command circuitry 230 may be configured to receive command and address information from the decoder 228 and store the command and address information in the queue 250. The command circuitry 230 may include logic 262 that processes command information (e.g., from a host device) and storage information from other components (e.g., the cache management circuitry 244, the buffer circuitry 224) and uses that information to generate one or more commands for the schedulers 248. The command circuitry 230 may also be configured to transfer address information (e.g., address bits) to the cache management circuitry 244. In some examples, the logic 26 2522 may be a circuit configured to operate as a finite state machine (FSM).

The buffer circuitry 224 may be coupled with the data bus interface 208, the command circuitry 230, the memory interface circuitry 234, and the memory interface circuitry 234. The buffer circuitry 224 may include a set of one or more buffer circuits for at least some banks, if not each bank, of the volatile memory 204. The buffer circuitry 224 may also include components (e.g., a memory controller) for accessing the buffer circuits. In one example, the volatile memory 204 may include sixteen banks and the buffer circuitry 224 may include sixteen sets of buffer circuits. Each set of the buffer circuits may be configured to store data from or for (or both) a respective bank of the volatile memory 204. As an example, the buffer circuit set for bank 0 (BK0) may be configured to store data from or for (or both) the first bank of the volatile memory 204 and the buffer circuit for bank 15 (BK15) may be configured to store data from or for (or both) the sixteenth bank of the volatile memory 204.

Each set of buffer circuits in the buffer circuitry 224 may include a pair of buffers. The pair of buffers may include one buffer (e.g., an open page data (OPD) buffer) configured to store data targeted by an access command (e.g., a storage command or retrieval command) from the host device and another buffer (e.g., a victim page data (VPD) buffer) configured to store data for an eviction process that results from the access command. For example, the buffer circuit set for BK0 may include the buffer 218 and the buffer 220, which may be examples of buffer 135-a and 135-b, respectively. The buffer 218 may be configured to store BK0 data that is targeted by an access command from the host device. And the buffer 220 may be configured to store data that is transferred from BK0 as part of an eviction process triggered by the access command. Each buffer in a buffer circuit set may be configured with a size (e.g., storage capacity) that corresponds to a page size of the volatile memory 204. For example, if the page size of the volatile memory 204 is 2 kB, the size of each buffer may be 2 kB. Thus, the size of the buffer may be equivalent to the page size of the volatile memory 204 in some examples.

The cache management circuitry 244 may be coupled with the command circuitry 230, the engines 246, and the schedulers 248, among other components. The cache management circuitry 244 may include a cache management circuit set for one or more banks (e.g., each bank) of volatile memory. As an example, the cache management circuitry 244 may include sixteen cache management circuit sets for BK0 through BK15. Each cache management circuit set may include two memory arrays that may be configured to store storage information for the volatile memory 204. As an example, the cache management circuit set for BK0 may include a memory array 252 (e.g., a CDRAM Tag Array (CDT-TA)) and a memory array 254 (e.g., a CDRAM Valid (CDT-V) array), which may be configured to store storage information for BK0. The memory arrays may also be referred to as arrays or buffers in some examples. In some examples, the memory arrays may be or include volatile memory cells, such as SRAM cells.

Storage information may include content information, validity information, or dirty information (or any combination thereof) associated with the volatile memory 204. Content information (which may also be referred to as tag information or address information) may indicate which data is stored in a set of volatile memory cells. For example, the content information (e.g., a tag address) for a set of one or more volatile memory cells may indicate which set of one or more non-volatile memory cells currently has data stored in the set of one or more volatile memory cells. As noted, validity information may indicate whether the data stored in a set of volatile memory cells is actual data (e.g., data having an intended order or form) or placeholder data (e.g., data being random or dummy, not having an intended or important order). And dirty information may indicate whether the data stored in a set of one or more volatile memory cells of the volatile memory 204 is different than corresponding data stored in a set of one or more non-volatile memory cells of the non-volatile memory 206. For example, dirty information may indicate whether data stored in a set of volatile memory cells has been updated relative to data stored in the non-volatile memory 206.

The memory array 252 may include memory cells that store storage information (e.g., content and validity information) for an associated bank (e.g., BK0) of the volatile memory 204. The storage information may be stored on a per-page basis (e.g., there may be respective storage information for each page of the associated non-volatile memory bank). The interface controller 202 may check for requested data in the volatile memory 204 by referencing the storage information in the memory array 252. For instance, the interface controller 202 may receive, from a host device, a retrieval command for data in a set of non-volatile memory cells in the non-volatile memory 206. The interface controller 202 may use a set of one or more address bits (e.g., a set of row address bits) targeted by the access request to reference the storage information in the memory array 252. For instance, using set-associative mapping, the interface controller 202 may reference the content information in the memory array 252 to determine which set of volatile memory cells, if any, stores the requested data.

In addition to storing content information for volatile memory cells, the memory array 252 may also store validity information that indicates whether the data in a set of volatile memory cells is actual data (also referred to as valid data) or random data (also referred to as invalid data). For example, the volatile memory cells in the volatile memory 204 may initially store random data and continue to do so until the volatile memory cells are written with data from a host device or the non-volatile memory 206. To track which data is valid, the memory array 252 may be configured to set a bit for each set of volatile memory cells when actual data is stored in that set of volatile memory cells. This bit may be referred to a validity bit or a validity flag. As with the content information, the validity information stored in the memory array 252 may be stored on a per-page basis. Thus, each validity bit may indicate the validity of data stored in an associated page in some examples.

The memory array 254 may be similar to the memory array 252 and may also include memory cells that store validity information for a bank (e.g., BK0) of the volatile memory 204 that is associated with the memory array 252. However, the validity information stored in the memory array 254 may be stored on a sub-block basis as opposed to a per-page basis for the memory array 252. For example, the validity information stored in the memory cells of the memory array 254 may indicate the validity of data for subsets of volatile memory cells in a set (e.g., page) of volatile memory cells. As an example, the validity information in the memory array 254 may indicate the validity of each subset (e.g., 32 B or 64 B) of data in a page of data stored in BK0 of the volatile memory 204. Storing content information and validity information on a per-page basis in the memory array 252 may allow the interface controller 202 to quickly and efficiently determine whether there is a hit or miss for data in the volatile memory 204. Storing validity information on a sub-block basis may allow the interface controller 202 to determine which subsets of data to preserve in the non-volatile memory 206 during an eviction process.

In addition to validity information, the interface controller 202 may use dirty information to manage the volatile memory 204 as a cache. Like the validity information, the dirty information may be stored on a sub-block basis (e.g., each dirty bit may indicate the dirty status of a subset of data in page of data). However, according to the techniques described herein, the dirty information may be stored in the volatile memory 204 as opposed to the memory array 254 in some examples. As described in greater detail elsewhere herein, splitting storage of validity information and dirty information between the memory array 254 and the volatile memory 204 may provide distinct advantages compared to other storage techniques.

Each cache management circuit set may also include a respective pair of registers coupled with the command circuitry 230, the engines 246, the memory interface circuitry 234, the memory interface circuitry 240, and the memory arrays for that cache management circuit set, among other components. For example, a cache management circuit set may include a first register (e.g., a register 256 which may be an open page tag (OPT) register) configured to receive storage information (e.g., one or more bits of tag information, validity information, or dirty information) from the memory array 252 or the scheduler 248-*b* or both. The cache management circuitry set may also include a second register (e.g., a register 258 which may be a victim page tag (VPT) register) configured to receive storage information from the memory array 254 and the scheduler 248-*a* or both. The information in the register 256 and the register 258 may be transferred to the command circuitry 230 and the engines 246 to enable decision-making by these components. For example, the command circuitry 230 may issue commands for reading the non-volatile memory 206 or the volatile memory 204 based on content information from the register 256.

The engine 246-*a* may be coupled with the register 256, the register 258, and the schedulers 248. The engine 246-*a* may be configured to receive storage information from various components and issue commands to the schedulers 248 based on the storage information. For example, when the interface controller 202 is in a first mode such as a write-through mode, the engine 246-*a* may issue commands to the scheduler 248-*b* and in response the scheduler 248-*b* to initiate or facilitate the transfer of data from the buffer 218 to both the volatile memory 204 and the non-volatile memory 206. Alternatively, when the interface controller 202 is in a second mode such as a write-back mode, the engine 246-*a* may issue commands to the scheduler 248-*b* and in response the scheduler 248-*b* may initiate or facilitate the transfer of data from the buffer 218 to the volatile memory 204. In the event of a write-back operation, the data stored in the volatile memory 204 may eventually be transferred to the non-volatile memory 206 during a subsequent eviction process.

The engine 246-*b* may be coupled with the register 258 and the scheduler 248-*a*. The engine 246-*b* may be configured to receive storage information from the register 258 and issue commands to the scheduler 248-*a* based on the storage information. For instance, the engine 246-*b* may issue commands to the scheduler 248-*a* to initiate or facilitate transfer of dirty data from the buffer 220 to the non-volatile memory 206 (e.g., as part of an eviction process). If the buffer 220 holds a set of data transferred from the volatile memory 204 (e.g., victim data), the engine 246-*b* may indicate which one or more subsets (e.g., which 64 B) of the set of data in the buffer 220 should be transferred to the non-volatile memory 206.

The scheduler 248-*a* may be coupled with various components of the interface controller 202 and may facilitate accessing the non-volatile memory 206 by issuing commands to the memory interface circuitry 234. The commands issued by the scheduler 248-*a* may be based on commands from the command circuitry 230, the engine 246-*a*, the engine 246-*b*, or a combination of these components. Similarly, the scheduler 248-*b* may be coupled with various components of the interface controller 202 and may facilitate accessing the volatile memory 204 by issuing commands to the memory interface circuitry 240. The commands issued by the scheduler 248-*b* may be based on commands from the command circuitry 230 or the engine 246-*a*, or both.

The memory interface circuitry 234 may communicate with the non-volatile memory 206 via one or more of the data bus interface 212 and the C/A bus interface 214. For example, the memory interface circuitry 234 may prompt the C/A bus interface 214 to relay commands issued by the memory interface circuitry 234 over the C/A bus 236 to a local controller in the non-volatile memory 206. And the memory interface circuitry 234 may transmit to, or receive data from, the non-volatile memory 206 over the data bus 232. In some examples, the commands issued by the memory interface circuitry 234 may be supported by the non-volatile memory 206 but not the volatile memory 204 (e.g., the commands issued by the memory interface circuitry 234 may be different than the commands issued by the memory interface circuitry 240).

The memory interface circuitry 240 may communicate with the volatile memory 204 via one or more of the data bus interface 216 and the C/A bus interface 264. For example, the memory interface circuitry 240 may prompt the C/A bus interface 264 to relay commands issued by the memory interface circuitry 240 over the C/A bus 242 to a local controller of the volatile memory 204. And the memory interface circuitry 240 may transmit to, or receive data from, the volatile memory 204 over one or more data buses 238. In some examples, the commands issued by the memory interface circuitry 240 may be supported by the volatile memory 204 but not the non-volatile memory 206 (e.g., the commands issued by the memory interface circuitry 240 may be different than the commands issued by the memory interface circuitry 234).

Together, the components of the interface controller 202 may operate the non-volatile memory 206 as a main memory and the volatile memory 204 as a cache. Such operation may be prompted by one or more access commands (e.g., read/ retrieval commands/requests and write/storage commands/ requests) received from a host device.

In some examples, the interface controller 202 may receive a storage command from the host device. The storage command may be received over the C/A bus 226 and transferred to the command circuitry 230 via one or more of the C/A bus interface 210 and the decoder 228. The storage command may include or be accompanied by address bits that target a memory address of the non-volatile memory 206. The data to be stored may be received over the data bus 260 and transferred to the buffer 218 via the data bus interface 208. In a write-through mode, the interface controller 202 may transfer the data to both the non-volatile memory 206 and the volatile memory 204. In a write-back mode, the interface controller 202 may transfer the data to only the volatile memory 204. In either mode, the interface controller 202 may first check to see if the volatile memory 204 has memory cells available to store the data. To do so, the command circuitry 230 may reference the memory array 252 (e.g., using a set of the memory address bits) to determine whether one or more of the n sets (e.g., pages) of volatile memory cells associated with the memory address are available (e.g., store random or invalid data). For example, the command circuitry 230 may determine whether one or more of the n sets of volatile memory cells is available based on tag information and validity information stored in the memory array 252. In some examples, a set of volatile memory cells in the volatile memory 204 may be referred to as a line or cache line.

If one of then associated sets of volatile memory cells is available for storing information, the interface controller 202 may transfer the data from the buffer 218 to the volatile memory 204 for storage in that set of volatile memory cells. But if no associated sets of volatile memory cells are empty, the interface controller 202 may initiate an eviction process to make room for the data in the volatile memory 204. The eviction process may involve transferring the old data (e.g., existing data) in one of the n associated sets of volatile memory cells to the buffer 220. The dirty information for the old data may also be transferred to the memory array 254 or register 258 for identification of dirty subsets of the old data. After the old data is stored in the buffer 220, the new data can be transferred from the buffer 218 to the volatile memory 204 and the old data can be transferred from the buffer 220 to the non-volatile memory 206. In some examples, dirty subsets of the old data are transferred to the non-volatile memory 206 and clean subsets (e.g., unmodified subsets) are discarded. The dirty subsets may be identified by the engine 246-b based on dirty information transferred (e.g., from the volatile memory 204) to the memory array 254 or register 258 during the eviction process.

In another example, the interface controller 202 may receive a retrieval command from the host device. The retrieval command may be received over the C/A bus 225 and transferred to the command circuitry 230 via one or more of the C/A bus interface 210 and the decoder 228. The retrieval command may include address bits that target a memory address of the non-volatile memory 206. Before attempting to access the targeted memory address of the non-volatile memory 206, the interface controller 202 may check to see if the volatile memory 204 stores the data. To do so, the command circuitry 230 may reference the memory array 252 (e.g., using a set of the memory address bits) to determine whether one or more of the n sets of volatile memory cells associated with the memory address stores the requested data. For example, the command circuitry 230 may determine whether one or more of the n sets of volatile memory cells stores the requested data based on tag information and validity information stored in the memory array 252. If the requested data is stored in the volatile memory 204, the interface controller 202 may transfer the requested data to the buffer 218 for transmission to the host device over the data bus 260.

If the requested data is not stored in the volatile memory 204, the interface controller 202 may retrieve the data from the non-volatile memory 206 and transfer the data to the buffer 218 for transmission to the host device over the data bus 260. Additionally, the interface controller 202 may transfer the requested data from the buffer 218 to the volatile memory 204 so that the data can be accessed with a lower latency during a subsequent retrieval operation. Before transferring the requested data, however, the interface controller 202 may first determine whether one or more of the n associated sets of volatile memory cells are available to store the requested data. The interface controller 202 may determine the availability of the n associated sets of volatile memory cells by communicating with the related cache management circuit set. If an associated set of volatile memory cells is available, the interface controller 202 may transfer the data in the buffer 218 to the volatile memory 204 without performing an eviction process. Otherwise, the interface controller 202 may transfer the data from the buffer 218 to the volatile memory 204 after performing an eviction process.

The memory subsystem 200 may be implemented in one or more configurations, including one-chip versions and multi-chip versions. A multi-chip version may include one or more constituents of the memory subsystem 200, including the interface controller 202, the volatile memory 204, and the non-volatile memory 206 (among other constituents or combinations of constituents), on a chip that is separate from a chip that includes one or more other constituents of the memory subsystem 200. For example, in one multi-chip version, respective separate chips may include each of the interface controller 202, the volatile memory 204, and the non-volatile memory 206. In contrast, a one-chip version may include the interface controller 202, the volatile memory 204, and the non-volatile memory 206 on a single chip.

As noted, the memory subsystem 200 may store different types of metadata in different memories of the memory subsystem 200. For example, the memory subsystem 200 may store dirty information in the volatile memory 204 and validity information in the memory array 254. Compared to storing both validity information and dirty information in the memory array 254, storing validity information in the memory array 254 and dirty data in the volatile memory 204 may allow use of a large volatile memory 204 (e.g., a volatile memory 204 that has more metadata than the memory array 254 can store or more metadata than is practical to store in the memory array 254). Compared to storing both validity information and dirty information in the volatile memory 204, storing validity information in the memory array 254 and dirty data in the volatile memory 204 may allow the interface controller 202 to perform a single read operation on the volatile memory 204 in the event of cache hit, as opposed to two read operations, because the validity determination is made by reading the memory array 254.

For example, the interface controller 202 may determine the validity of stored data by reading the memory array 254 instead of the volatile memory 204, which means that a cache hit only involves one read operation on the volatile memory 204 (to retrieve the data). Similarly, no read operations are performed on the volatile memory array 204 in the event of a cache miss. Although determining the validity involves performing a read operation on the memory array 254, reading the memory array 254 instead of the volatile memory 204 may be faster and consume less power, among other advantages.

Thus, splitting storage of validity information and dirty information between the memory array 254 and the volatile memory 204 may provide distinct benefits compared to other storage techniques.

Figure 3:
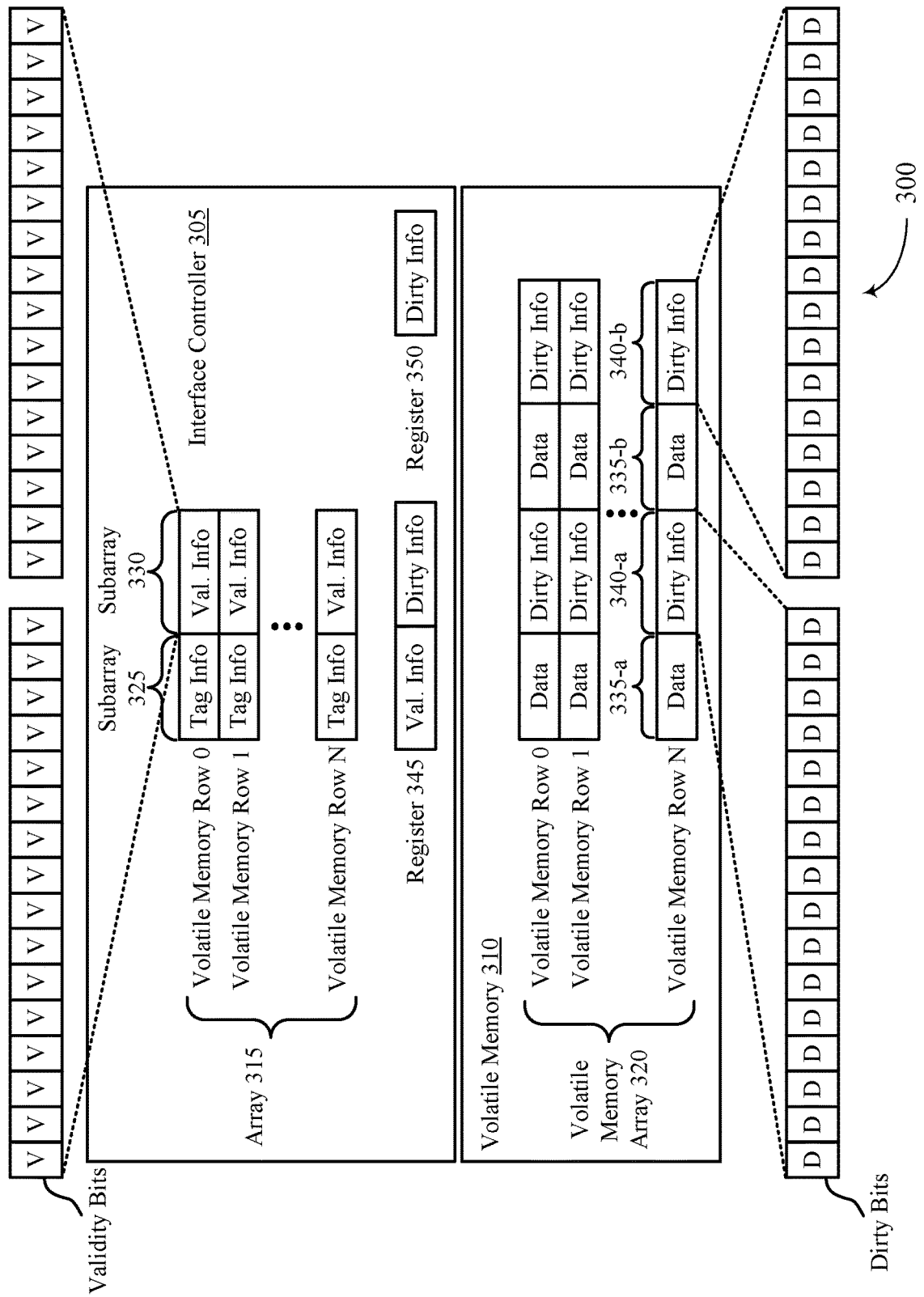
FIG. 3 illustrates an example of a device that supports cache metadata management in accordance with examples as disclosed herein.

FIG. 3 illustrates an example of a device 300 that supports cache metadata management in accordance with examples as disclosed herein. The device 300 may be an example of the memory subsystem 110 as described with reference to FIG. 1 or the memory subsystem 200 as described with reference to FIG. 2. The device 300 may include an interface controller 305 and volatile memory 310, which may be coupled with one another via one or more transmission lines and/or buses. The interface controller 305 may be an example of the interface controller 115 as described with reference to FIG. 1 or the interface controller 202 as described with reference to FIG. 2. The volatile memory 310 may be an example of the volatile memory 120 as described with reference to FIG. 1 or the volatile memory 204 as described with reference to FIG. 2. As described herein, device 300 may store validity information in an array 315 in the interface controller 305 and dirty information in the volatile memory 310.

The interface controller 305 may include the array 315, which may also be referred to as a memory array or a tag array. The array 315 may include a subarray 325 and a subarray 330, which may be examples of the memory array 252 and the memory array 254, respectively, as described with reference to FIG. 2. Thus, the array 315 may include a plurality of memory volatile memory cells, such as SRAM cells. The array 315 may store tag information for the volatile memory array 320 in the subarray 325 and validity information for the volatile memory array 320 in the subarray 330. The tag information in the subarray 325 may indicate tag addresses for one or more rows in an associated bank (e.g., BK0) of the volatile memory array 320. For example, the subarray 325 may store tag information for row 0 through row N in the volatile memory array 320. In some examples, the subarray 325 may also include validity information that indicates validity on a row-basis (e.g., one bit may indicate whether an associated row has valid or invalid data).

The validity information in the subarray 330 may indicate validity for portions of a row in the associated bank (e.g., BK0) of the volatile memory array 320. For example, the subarray 330 may store validity information for thirty-two portions of row 0 in BK0. The validity information for a portion may also be referred to as a validity bit or validity flag. In the example of FIG. 3, the subarray 330 stores thirty-two validity bits, one for each portion of a row. In some examples, a portion of a memory row may be or include thirty-two memory cells or sixty-four memory cells, and thus may store 32 B or 64 B of data, respectively. A portion of a memory or memory row may also be referred to as a set of memory cells, a subset of memory cells, a section of memory, a subset of memory cells, or other suitable terminology given the context. Similarly, data stored in a portion of a memory or memory row may be referred to as a set of data, a subset of data, a subpage of data, or other suitable terminology.

The volatile memory 310 may include a local controller and circuitry for accessing the volatile memory array 320, which may be or include a bank of volatile memory cells (e.g., BK0) associated with array 315. The volatile memory array 320 may include multiple columns and multiple rows of volatile memory cells (e.g., DRAM cells). For example, the volatile memory array 320 may include row 0 through row N. The volatile memory array 320 may include one or more sections of memory that are reserved for (e.g., dedicated to) storing data and other sections of memory that are reserved for storing dirty information. For example, one or more rows may include sections of memory that are reserved for storing data ("data sections") and sections of memory that are reserved for storing dirty information ("dirty information sections"). A section of memory may include portions of memory (e.g., sets of thirty-two memory cells or sets of sixty-four memory cells) that are associated with respective validity information stored in the subarray 330. In some examples, a row may include 2 KB of data (e.g., 1 KB of data in a first data section and 1 KB of data in a second data section).

In some examples, each data section may be associated with a corresponding dirty information section that stores dirty information for that data section. For example, in row N, dirty information section 340-a may store dirty information for associated data section 335-a and dirty information section 340-b may store dirty information for associated data section 335-a. At a lower level of granularity, each portion in a data section may be associated with a respective dirty bit in the corresponding dirty information section. For example, if data section 335-a includes sixteen portions, dirty information section 340-a may include sixteen bits each associated with a respective data portion from data section 335-a. Similarly, if data section 335-b includes sixteen portions, dirty information section 340-b may include sixteen bits each associated with a respective data portion from data section 335-b. Thus, a set of memory cells (e.g., a portion of memory) in the volatile memory array 320 may be associated with a dirty bit in the volatile memory array 320 and a validity bit in the subarray 330.

To quickly access the validity information stored in the subarray 330 and the dirty information stored in the volatile memory array 320, the interface controller 305 may issue commands to local controllers that cause the metadata to be transferred to registers in the interface controller 305. For example, validity information and dirty information may be transferred to a register 345 and dirty information may be transferred to a register 350. The register 345 may be an example of the register 256 (e.g., an OPT register) as described with reference to FIG. 2, and the register 350 may be an example of the register 258 (e.g., a VPT register) as described with reference to FIG. 2. After the validity information and the dirty information have been transferred to the registers, the interface controller 305 may access the registers to efficiently reference the validity information and the dirty information for cache management purposes. Although shown storing validity information and dirty information, the register 345 may also store other information, such as tag information transferred from the subarray 325. Similarly, although shown storing dirty information, the register 350 may also store other information, such as tag information transferred from the subarray 325.

In some examples, the interface controller 305 may transfer validity information from the subarray 330 and dirty information from the volatile memory array 320 to the register 345. As part of an access operation, the interface controller 305 may reference the validity information in the register 345 to determine which sets of memory cells (portions of memory) store valid data. If the access operation results in data being written to the volatile memory array 320, the interface controller may update the dirty information in the register 345 to reflect any changes in dirty status for portions of the volatile memory array 320. If the access operation triggers in an eviction process, the interface controller 305 may transfer dirty information from the volatile memory array 320 to the register 350. The interface controller 305 may then reference the dirty information in the register 350 to determine which sets of memory cells store dirty data that should be written back to a non-volatile memory.

To maintain the accuracy of the validity information and the dirty information after performing access operations on the volatile memory array 320, the device may update the validity information and dirty information in the register 345 as applicable. For example, after writing to a portion of the volatile memory array 320, the device may update the corresponding validity bit in the register 345. Once a command is received to close the row, the device may write the validity information in the register 345 back to the subarray 330 so that the subarray 330 has accurate (e.g., updated) validity information for the row. As another example, after writing to a portion of the volatile memory array 320, the device may update the corresponding dirty bit in the register 345. Once a command is received to close the row, the device may write the dirty information in the register 345 back to the volatile memory array 320 so that the volatile memory array 320 has accurate (e.g., updated) dirty information for the row.

Thus, a device 300 that stores validity information in the subarray 330 and dirty information in the volatile memory array 320 may use registers to reference and update the validity information and dirty information and more efficiently and effectively operate.

Figure 4:
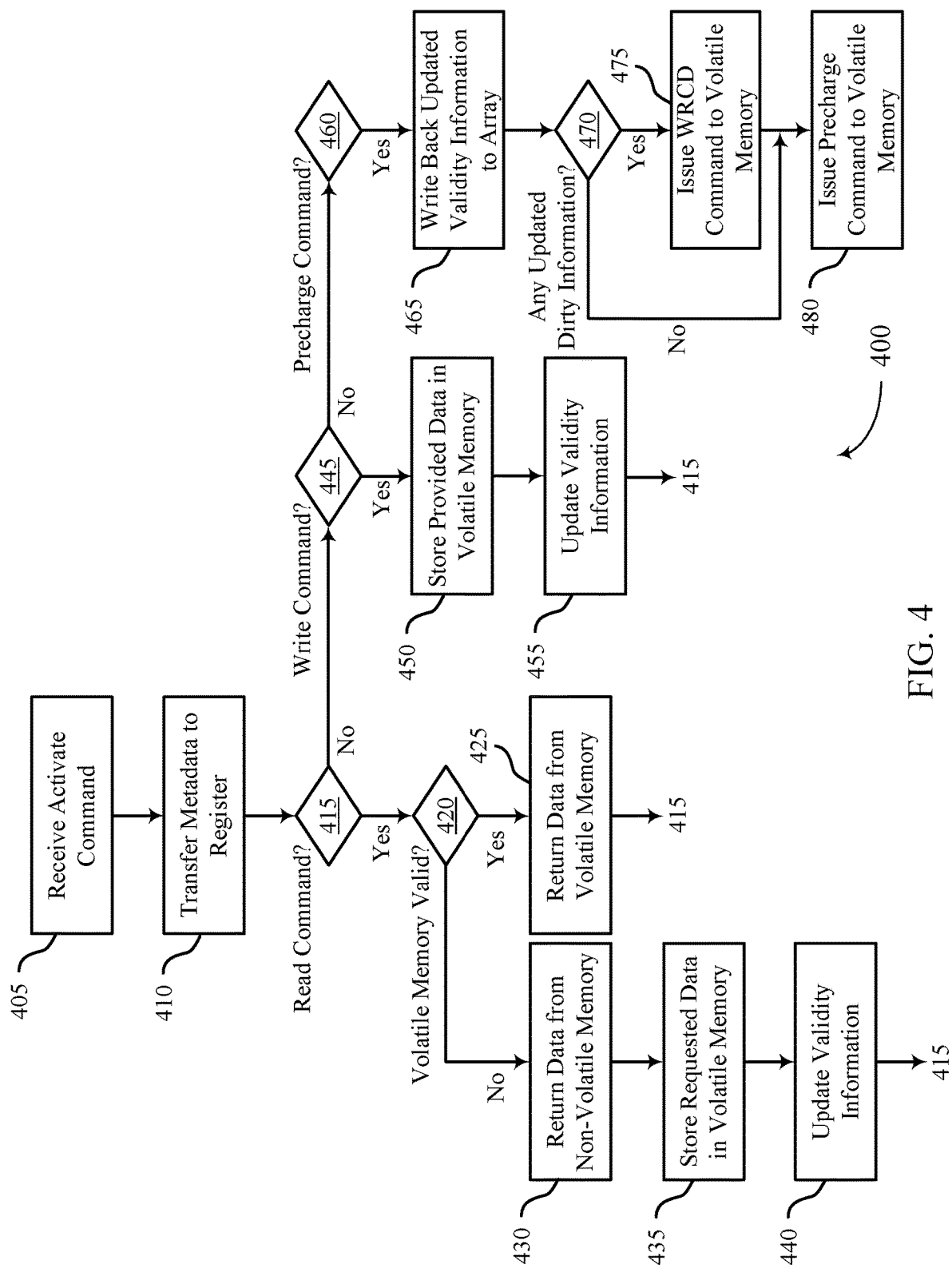
FIGS. 4 through 6 illustrate examples of process flows that support cache metadata management in accordance with examples as disclosed herein.

FIG. 4 illustrates an example of a process flow 400 that supports cache metadata management in accordance with examples as disclosed herein. The process flow 400 may be an example of a process flow implemented by a device that stores validity information in an array and dirty information in a volatile memory that serves as a cache for a non-volatile memory. Thus, the process flow 400 may be implemented by the memory subsystem 110 described with reference to FIG. 1, the memory subsystem 200 described with reference to FIG. 2, or the device 300 described with reference to FIG. 3, among other examples.

In some examples, aspects of the process flow 400 may be implemented by an interface controller, among other components. Additionally or alternatively, aspects of the process flow 400 may be implemented as instructions stored in memory (e.g., firmware stored in the volatile memory 120 and/or the non-volatile memory 125). For example, the instructions, when executed by a controller (e.g., the interface controller 115), may cause the controller to perform the operations of the process flow 400.

Alternative examples of the process flow 400 may be implemented in which some operations are performed in a different order than described or are not performed at all. In some examples, the process flow 400 may include operations not mentioned below (e.g., additional operations may be added). Additionally, some operations may be performed in parallel (e.g., concurrently, or during overlapping times).

At 405, the device may receive from a host device an activate (ACT) command associated with a row (e.g., row N) of a volatile memory, such as the volatile memory array 320. In response to the activate command, the device may, at 410, transfer metadata for the row to a register in the device, such as the register 345. For example, the device may transfer to the register 345 tag information for row N from the subarray 325 and validity information (e.g., thirty-two validity bits) for row N from the subarray 330. In some examples, the device may transfer to the register 345 dirty information for row N from the volatile memory array 320. The device may also open the associated row of volatile memory (e.g., the device may open row N in the volatile memory array 320). Opening a row may also be referred to as activating the row and may involve applying an activation voltage to the word line associated with the row.

At 415, the device may determine whether a subsequent command received from the host device is a read command. If the device determines that the subsequent command is a read command, the device may, at 420, determine whether the data stored in row N of the volatile memory array 320 is valid. The device may determine the validity of the data stored in row N by referencing the validity information in the register 345. If the data stored in row N is determined to be valid, the device may, at 425, return the data stored in row N to the host device. The device may then return to step 415. The device may not update the validity information in the register 345 because the validity information already indicates that the data stored in row N is valid (i.e., the validity information is already accurate).

If, at 420, the data stored in row N is determined to be invalid, the device may, at 430, return the requested data from the non-volatile memory to the host device. At 435, the device may store the requested data in the volatile memory array 320 (e.g., for faster retrieval in the future). For example, the device may store the requested data in row N. Accordingly at 440, the device may update the validity information in the register 345 for row N. For example, the device may modify the state of the validity bits in the register 345 that are associated with portions of row N that have been written with the requested data. The device may also update the dirty information for row N, as applicable, in the register 345. After updating the relevant metadata in the register 345, the device may return to step 415.

If, at 415, the device determines that the subsequent command is not a read command, the device may, at 445, determine whether the subsequent command is a write command. If the device determines that the subsequent command is a write command, the device may, at 450, write data provided by the host device to the volatile memory array 320. For example, the device may store the requested data in row N. Accordingly at 455, the device may update the validity information in the register 345 for row N. For example, the device may modify the state of the validity bits in the register 345 that are associated portions of row N that have been written with the provided data. The device may also update the dirty information for row N and/or the tag information for row N, as applicable, in the register 345. After updating the validity information in the relevant metadata in register 345, the device may return to step 415.

If, at 445, the device determines that the subsequent command is not a write command, the device may, at 460, determine whether the subsequent command is a precharge command. Although shown separately, in some examples, the determinations at 415, 445, and 460 may be condensed into a single operation. If the device determines that the subsequent command is a precharge command, the device may, at 465, update the validity information stored in the subarray 330 by writing the validity information in the register 345 back to the subarray 330. In some examples, the validity information is updated in the subarray 330 using a masked write operation as described with reference to FIG. 7.

At 470, the device may determine whether any dirty information in the register 345 has been updated. For example, dirty information may have been updated in the register 345 in response to the device writing data to the volatile memory array 320 but not the non-volatile array (which may occur, e.g., in write-back mode). If the device determines that dirty information has been updated, the device may, at 475, issue a special write command (e.g., a Write Cdt Dirty flag (WRCD)) command to the volatile memory 310 so that the updated dirty information in the register 345 is written to the volatile memory array 320. In some examples, the dirty information is updated in the volatile memory array 320 using a masked write operation as described with reference to FIG. 7. After updating the dirty information in the volatile memory array 320, the device may, at 475, issue a precharge command to the volatile memory 310 to close the row.

Thus, a device that stores metadata in two different memories may update the metadata for an open row in a register and may preserve the updated metadata in the memories by writing the updated metadata back to the memories when the row closes.

Figure 5:
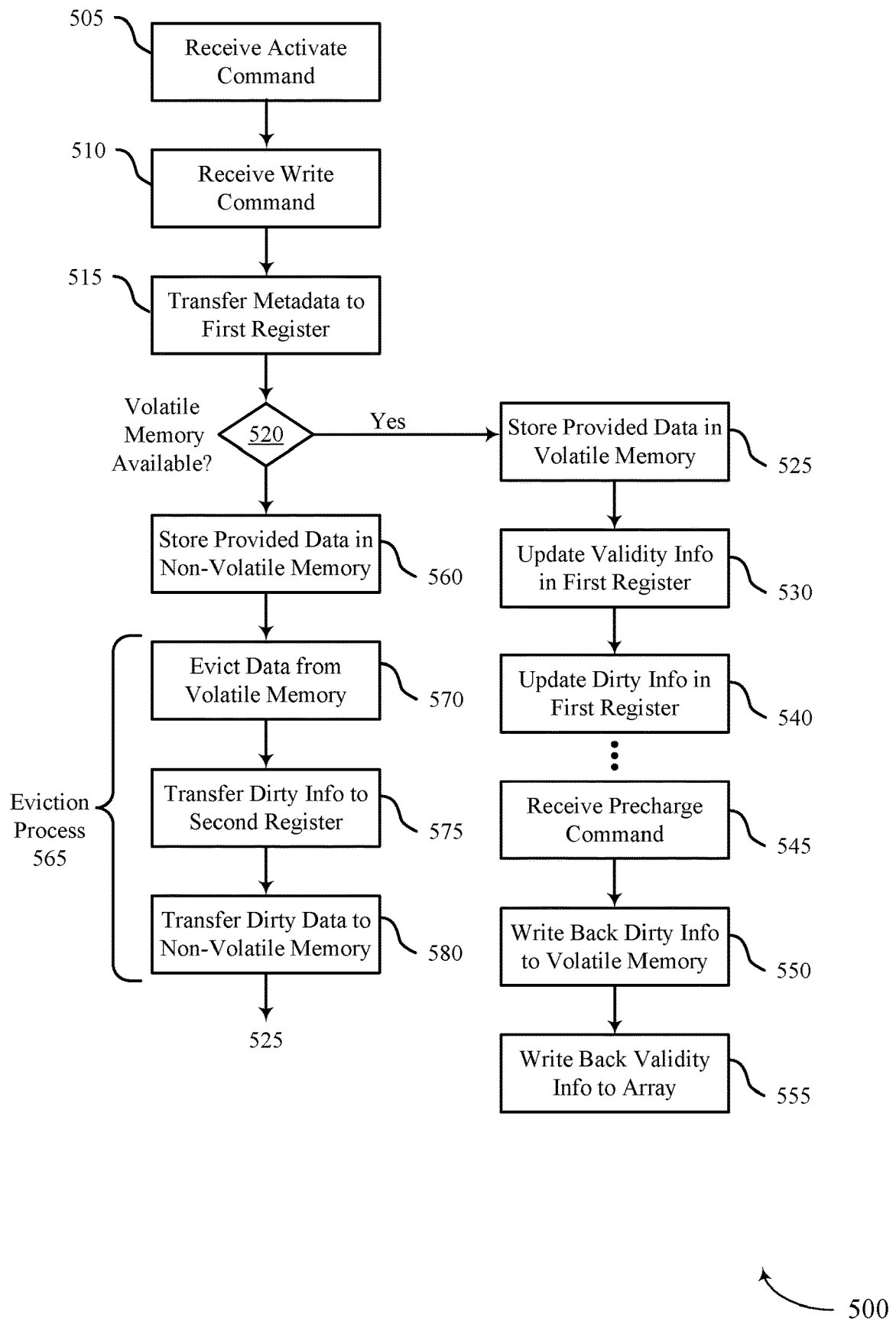

FIG. 5 illustrates an example of a process flow 500 that supports cache metadata management in accordance with examples as disclosed herein. The process flow 500 may be an example of a process flow implemented by a device that stores validity information in an array and dirty information in a volatile memory that serves as a cache for a non-volatile memory. Thus, the process flow 500 may be implemented by the memory subsystem 110 described with reference to FIG. 1, the memory subsystem 200 described with reference to FIG. 2, or the device 300 described with reference to FIG. 3. The process flow 500 may include aspects of the process flow 400, or vice versa. For example, the process flow 500 may be implemented by the device when a write command is received (e.g., as part of a storage operation).

In some examples, aspects of the process flow 500 may be implemented by an interface controller, among other components. Additionally or alternatively, aspects of the process flow 500 may be implemented as instructions stored in memory (e.g., firmware stored in the volatile memory 120 and/or the non-volatile memory 125). For example, the instructions, when executed by a controller (e.g., the interface controller 115), may cause the controller to perform the operations of the process flow 500.

Alternative examples of the process flow 500 may be implemented in which some operations are performed in a different order than described or are not performed at all. In some examples, the process flow 500 may include operations not mentioned below (e.g., additional operations may be added). Additionally, some operations may be performed in parallel (e.g., concurrently, or during overlapping times).

At 505, the device may receive (e.g., from a host device over a command bus) an activate command for a bank of a non-volatile memory. The activate command may be associated with a row address that indicates a row of the non-volatile memory. At 510, the device may receive (e.g., from the host device over the command bus) a write command for the row. The write command may be associated with data provided by host device. The write command may also be referred to as a storage command. At 515, the device may transfer, in response to the write command, metadata for the volatile memory row (e.g., tag information, validity information, and dirty information) into a first register (e.g., the register 256 or the register 345). The validity information may include validity information for the row (e.g., a bit representing the validity status of the row) and/or validity information for portions of the row (e.g., thirty-two bits each representing the validity status of a respective portion of the row). The validity information for the portions of the row may be transferred to the first register from an array, such as the subarray 330. The dirty information may include dirty information for portions of the row (e.g., thirty-two bits each representing the dirty status of a respective portion of the row). The dirty information for the portions of the row may be transferred to the first register from volatile memory, such as the volatile memory array 320.

At 520, the device may determine whether a row of volatile memory associated with the row of non-volatile memory is available to store the provided data. For example, the device may reference the tag information and validity information in the first register to see if valid data is already stored in the row of volatile memory. If the row of volatile memory is available, the device may, at 525, store the data in the row of volatile memory. For example, the device may activate the row of volatile memory and write the provided data to some or all portions of the row of volatile memory. The provided data may be transferred to the volatile memory from a first buffer (e.g., the buffer 135-*a* or the buffer 218). At 530, the device may update the validity information in the first register based on storing the data in the row of volatile memory. For example, the device may modify the validity bits associated with the portions of the row to which the data was written. The device may also update the tag information for the row to reflect which data is stored there.

At 540, the device may update the dirty information in the first register based on storing the data in the row of volatile memory. For example, the device may modify the dirty bits associated with the portions of the row to which the data was written. If the device is operating in write-through mode (in which the data is also stored in the non-volatile memory), the device may update appropriate dirty bits to reflect that the corresponding portions store clean data. If the device is operating in write-back mode, the device may update appropriate dirty bits to reflect that the corresponding portions store dirty data.

After 540, the device may continue to access the row of volatile memory (e.g., by reading from the row or writing to the row) until the device receives a precharge command at 545. In response to the precharge command, the device may, at 550, update the dirty information in the volatile memory by writing the dirty information in the first register back to the volatile memory. Also in response to the precharge command in some examples, the device may, at 555, update the validity information in the array by writing the validity information in the first register back to the array. In some examples, the device may update the validity information and/or the dirty information using one or more masked write operations, as described with reference to FIG. 7. Additionally, the device may close the row of volatile memory so that another row in the bank can be opened.

If, at 520, the device determines that the row of volatile memory is not available, the device may, at 560, store the provided data in the non-volatile memory. The provided data may be transferred to the non-volatile memory from the first buffer. At 570, the device may evict data (e.g., a page) from the row of volatile memory by transferring the data to a second buffer (e.g., the buffer 135-*b* or the buffer 220) in the device. The operations at 570 may be part of the eviction process 565, which may free up space in the volatile memory for new data and preserve old data in the non-volatile memory.

At 575, the device may transfer the dirty information associated with the row of volatile memory to the second register. By transferring the dirty information to the second register, the device may efficiently reference the dirty information to determine which sets of data should be stored in the non-volatile memory. At 580, the device may transfer dirty sets of victim data from the buffer to the non-volatile memory for storage. The device may also discard clean sets of victim data that do not need to be stored in the non-volatile memory (e.g., because they are already stored there). After 580, the device may perform the operations at 525. For example, the device may store the provided data in the open row of the volatile memory by transferring the provided data to the volatile memory (e.g., from the first buffer) and writing the provided data to one or more portions of the open row. The device may then continue perform the operations at 530 through 555.

Thus, a device may service a request from a host device to store data by using metadata stored in two different memories of the device.

Figure 6:
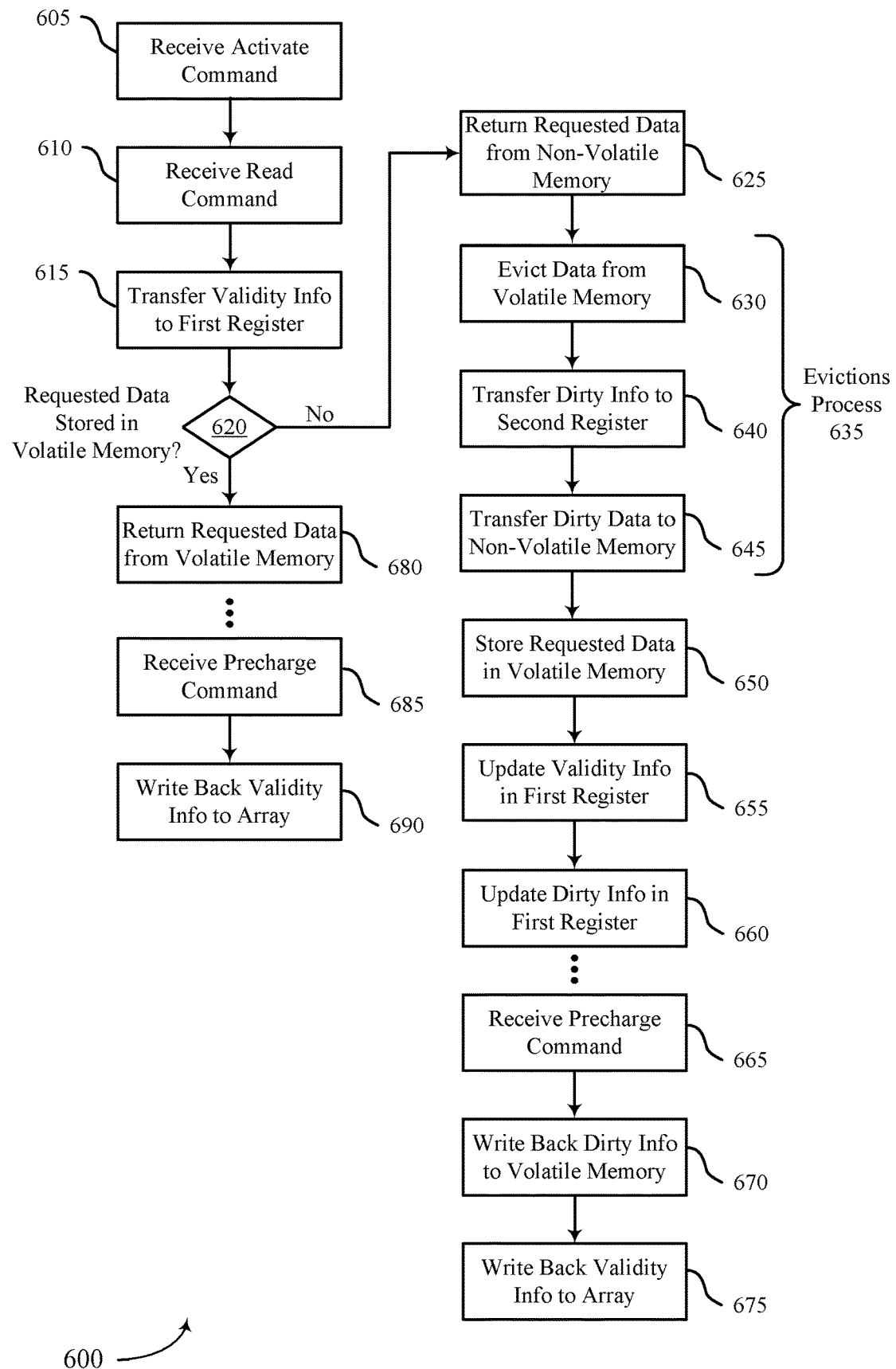

FIG. 6 illustrates an example of a process flow 600 that supports cache metadata management in accordance with examples as disclosed herein. The process flow 600 may be an example of a process flow implemented by a device that stores validity information in an array and dirty information in a volatile memory that serves as a cache for a non-volatile memory. Thus, the process flow 600 may be implemented by the memory subsystem 110 described with reference to FIG. 1, the memory subsystem 200 described with reference to FIG. 2, or the device 300 described with reference to FIG. 3. The process flow 600 may include aspects of the process flow 400 and the process flow 500, or aspects of the process flow 600 may be included in the process flow 400 and the process flow 500. For example, the process flow 600 may be implemented by the device when a read command is received (e.g., as part of a retrieval operation).

In some examples, aspects of the process flow 600 may be implemented by an interface controller, among other components. Additionally or alternatively, aspects of the process flow 600 may be implemented as instructions stored in memory (e.g., firmware stored in the volatile memory 120 and/or the non-volatile memory 125). For example, the instructions, when executed by a controller (e.g., the interface controller 115), may cause the controller to perform the operations of the process flow 600.

Alternative examples of the process flow 600 may be implemented in which some operations are performed in a different order than described or are not performed at all. In some examples, the process flow 600 may include operations not mentioned below (e.g., additional operations may be added). Additionally, some operations may be performed in parallel (e.g., concurrently, or during overlapping times).

At 605, the device may receive (e.g., from a host device over a command bus) an activate command for a bank of a non-volatile memory. The activate command may be associated with a row address that indicates a row of the non-volatile memory. At 610, the device may receive (e.g., from the host device over the command bus) a read command for the row. The read command may be associated with data requested by the host device. The read command may also be referred to as a retrieval command.

At 615, the device may transfer, in response to the read command, tag information, validity information, and dirty information into a first register (e.g., the register 256 or the register 345). The validity information may include validity information for a row of volatile memory associated with the row address of non-volatile memory. The validity information may include a bit that represents the validity status of the row of volatile memory and/or validity bits for portions of the row (e.g., thirty-two bits each representing the validity status of a respective portion of the row). The validity information for the portions of the row may be transferred to the first register from an array such as the subarray 330. The dirty information may include dirty information for portions of the row (e.g., thirty-two bits each representing the dirty status of a respective portion of the row). The dirty information for the portions of the row may be transferred to the first register from volatile memory, such as the volatile memory array 320.

At 620, the device may determine whether the row of volatile memory stores the requested data. For example, the device may 1) reference the tag information in the first register to determine whether data stored in the row is associated with the non-volatile row address and 2) reference the validity information in the first register to determine whether the data stored in the row is valid data. If the row of volatile memory stores unrequested data or invalid data, the device may, at 625, return the requested data to the host device from the row of non-volatile memory. For example, the device may transfer the requested data to a first buffer, such as the buffer 135-*a* or the buffer 218, for transmission to the host device.

At 630, the device evict data (e.g., a page) from the row of volatile memory by transferring the data to a second buffer (e.g., the buffer 135-*b* or the buffer 220) in the device. The operations at 630 may be part of the eviction process 635, which may free up space in the volatile memory for requested data and preserve old data in the non-volatile memory. At 640, the device may transfer the dirty information associated with the row of volatile memory to a second register (e.g., the register 258 or the register 350). By transferring the dirty information to the second register, the device may efficiently reference the dirty information to determine which sets of data should be stored in the non-volatile memory. At 645, the device may transfer dirty sets of victim data from the buffer to the non-volatile memory for storage. The device may also discard clean sets of victim data that do not need to be stored in the non-volatile memory (e.g., because they are already stored there).

At 650, the device may store the requested data in the row of volatile memory. For example, the device may activate the row of volatile memory and write the requested data to some or all portions of the row of volatile memory. The requested data may be transferred to the volatile memory from the first buffer (e.g., the buffer 135-*a* or the buffer 218). At 655, the device may update the validity information in the first register based on storing the data in the row of volatile memory. For example, the device may modify the validity bits associated with the portions of the row to which the requested data was written.

At 660, the device may update the dirty information in the first register. For example, the device may modify the dirty bits associated with the portions of the row to which the requested data was written. Because the row of volatile memory stores the same data as the non-volatile memory, the device may update appropriate dirty bits to reflect that the corresponding portions store clean data.

After 660, the device may continue to access the row of volatile memory (e.g., by reading from the row or writing to the row) until the device receives a precharge command at 665. In response to the precharge command, the device may, at 670, update the dirty information in the volatile memory by writing the dirty information in the first register back to the volatile memory. Also in response to the precharge command, the device may, at 675, update the validity information in the array by writing the validity information in the first register back to the array. In some examples, the device may update the validity information and/or the dirty information using one or more masked write operations, as described with reference to FIG. 7. Additionally, the device may close the row of volatile memory so that another row in the bank can be opened.

If, at 620, the device determines that the row of volatile memory stores valid requested data, the device may, at 680, return the data to the host device from the row of volatile memory. For example, the device may activate the row of volatile memory and transfer the requested data to the host device (e.g., via the first buffer). After 680, the device may continue to access the row of volatile memory (e.g., by reading from the row or writing to the row) until the device receives a precharge command at 685. In response to the precharge command, the device may, at 690, update the validity information in the array by writing the validity information in the first register back to the array. Additionally, the device may close the row of volatile memory so that another row in the bank can be opened.

Thus a device may service a request for data from a host device by using metadata stored in two different memories of the device.

Figure 7:
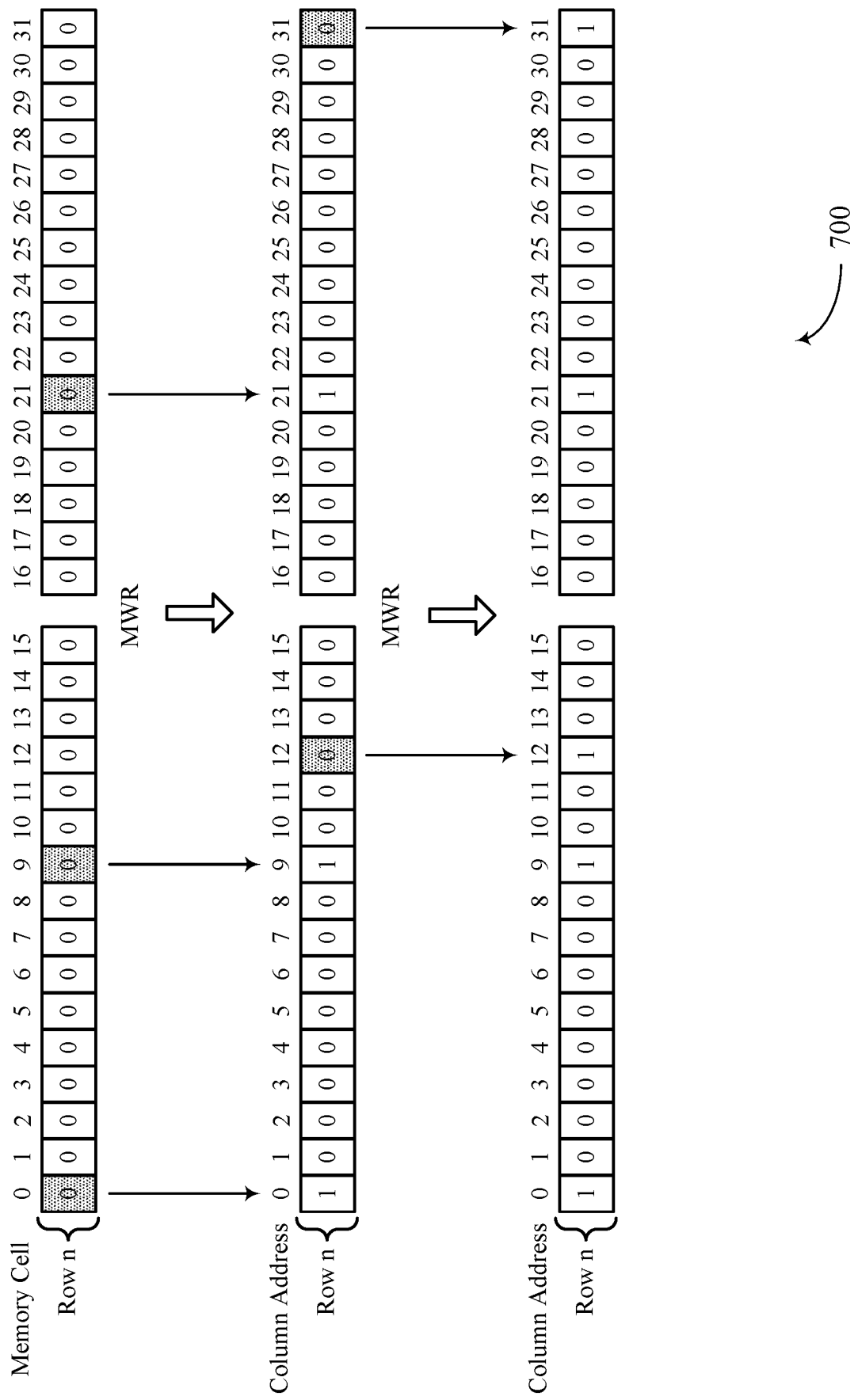
FIG. 7 shows a row a volatile memory that supports cache metadata management in accordance with aspects of the present disclosure.

FIG. 7 illustrates an example of a row 700 of volatile memory at different times during update procedures that support cache metadata management in accordance with examples as disclosed herein. The update procedures may include one or more masked write (MWR) operations and may be an example of update procedures implemented by a device that stores validity information in an array and dirty information in a volatile memory. For example, the update procedures may be implemented by the memory subsystem 110 described with reference to FIG. 1, the memory subsystem 200 described with reference to FIG. 2, or the device 300 described with reference to FIG. 3.

Aspects of the update procedures may be included in the process flow 400, the process flow 500, or the process flow 600. For example, the update procedures may be implemented by the device to update the dirty information in the volatile memory. Although described with respect to dirty information, the update procedure may be used to update the validity information in the array of the device.

The row 700 may be a row of a bank in a volatile memory as described herein. For example, the row 700 may be row n in the volatile memory 204 or the volatile memory array 320. The row 700 may include multiple memory cells each storing a dirty bit that corresponds to a portion of a row in the volatile memory. Thus, the row 700 may store validity information for a corresponding row of the volatile memory. Each memory cell in the row 700 may be associated with a respective column address so that the memory cell has a unique address relative to other memory cells in the row 700.

Initially (e.g., upon start-up, reset, or some other procedure), the dirty information in row 700 may be set to a default configuration, such as all logic zeros, to indicate that invalid data is stored in the portions of the corresponding row. For example, the dirty information in row 700 may indicate that the 64 B stored in each portion of a 2 kB row is invalid.

At some point, the device may write data to one or more portions of the volatile memory. For example, the device may write data to portions of the row associated with row 700. If the data is inconsistent with corresponding data in an associated row of non-volatile memory, or if the data is absent from the associated row of non-volatile memory, the device may determine to update the dirty information in row 700 to reflect as much. In some examples, the device may track which dirty bits need updating by using a register such as the register 258 or the register 350.

In such an example, the device may determine that the dirty bits stored in memory cell 0, memory cell 9, and memory cell 21 need updating (e.g., the dirty bits stored in memory cell 0, memory cell 9, and memory cell 21 have been modified in the register). Accordingly, the device may issue a masked write command to the volatile memory so that a masked write operation is performed on row 700. A masked write operation may update a subset of dirty bits in a row while preserving the state of other dirty bits in the row. For example, performing a masked write operation on row 700 may the change dirty bits in memory cell 0, memory cell 9, and memory cell 21 from zeros to ones without affecting the dirty bits in the other memory cells of row 700.

A masked write operation may provide latency and bandwidth benefits relative to alternative update procedures, such as a read-modify-write (RMW) procedure. An RMW procedure may involve a device reading a row that stores data to be modified, determining which bits are to be modified, and writing to the entire row (e.g., writing new values to the bits to be modified and writing the same values to the bits that are to be preserved). So, performing an RMW procedure to update dirty bits may involve an additional read operation compared to a masked write operation, which increases the latency, power consumption, and bandwidth consumption.

After the masked write operation is performed to update the dirty bits in memory cell 0, memory cell 9, and memory cell 21, the device may write data to additional portions of the row associated with row 700. For example, the device may write data to the portions associated with memory cell 12 and memory cell 31. If the data written to memory cell 12 and memory cell 31 is inconsistent with corresponding data in an associated row of non-volatile memory, or if the data is absent from the associated row of non-volatile memory, the device may determine to update the dirty information in row 700 to reflect as much. As noted, the device may track which dirty bits need updating by using a register such as the register 258 or the register 350. Upon determining to update the dirty bits in memory cell 12 and memory cell 31, the device initiate a masked write operation for those memory cells to effectuate the update. The masked write operation may change the dirty bits in memory cell 12 and memory cell 31 from zeros to ones without affecting the dirty bits in the other memory cells of row 700.

Thus, a device may implement masked write operations to update dirty bits stored in a volatile memory. Although described with respect to dirty information, the update procedure may be used to update the validity information in an array of the device.

Figure 8:
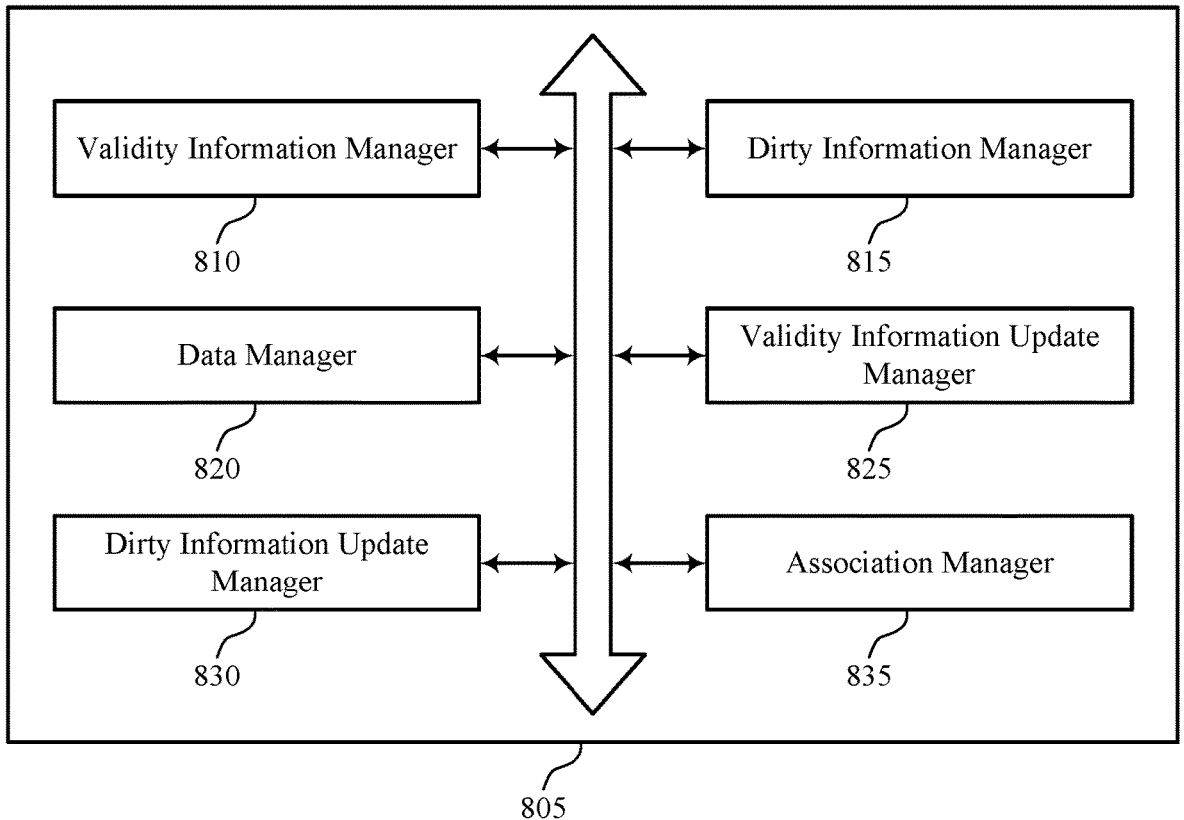
FIG. 8 shows a block diagram of a memory subsystem that supports cache metadata management in accordance with aspects of the present disclosure.

FIG. 8 shows a block diagram 800 of a memory subsystem 805 that supports cache metadata management in accordance with examples as disclosed herein. The memory subsystem 805 may be an example of aspects of a memory subsystem 110 or memory subsystem 200 as described with reference to FIGS. 1 and 2, respectively. Thus, the memory subsystem 805 may be coupled with a host device, a volatile memory, and a non-volatile memory. The memory subsystem 805 may include a validity information manager 810, a dirty information manager 815, a data manager 820, a validity information update manager 825, a dirty information update manager 830, and an association manager 835. Each of these modules may include circuitry configured to perform the functions described herein. Each of these modules may communicate, directly or indirectly, with one another (e.g., via one or more buses or other conductive connections).

The memory subsystem 805 may be configured to manage cache metadata as described herein. In a first example, the validity information manager 810 may be configured to store, in an array (e.g., the array 254, the subarray 330) in the interface controller, validity information that indicates whether data stored in a set of volatile memory cells in the volatile memory was previously written to the set of volatile memory cells in response to an access command from a host device coupled with the interface controller. The set of memory cells may be a row of the volatile memory or one or more portions of a row of the volatile memory. The dirty information manager 815 may be configured to store, in the volatile memory, dirty information that indicates whether the data stored in the set of volatile memory cells in the volatile memory is absent from the non-volatile memory or inconsistent with corresponding data in the non-volatile memory.

The validity information manager 810 may be configured to transfer the validity information from the array to a first register (e.g., the register 256, the register 345) based at least in part on the access command from the host device. The dirty information manager 815 may be configured to transfer the dirty information from the volatile memory to a second register (e.g., the register 258, the register 350) based at least in part on transferring the data stored in the set of volatile memory cells to a buffer (e.g., the buffer 135-*b*, the buffer 220).

The data manager 820 may be configured to replace the data stored in the set of volatile memory cells with second data. The validity information update manager 825 may be configured to update the validity information for the set of volatile memory cells based at least in part on replacing the data with the second data. In some examples, the validity information is or includes a single validity bit of a plurality of validity bits. In such cases, the validity information update manager 825 may be configured to update the validity information by performing a masked write operation in which a subset of the plurality of validity bits in the array are modified and remaining validity bits are maintained.

The data manager 820 may be configured to replace the data stored in the set of volatile memory cells with second data. The dirty information update manager 830 may be configured to update the dirty information for the set of volatile memory cells based at least in part on replacing the data with the second data. In some examples, the data manager 820 may be configured to transfer, to a buffer (e.g., the buffer 135-*b*, the buffer 220) in the interface controller, the data stored in the set of volatile memory cells before the data is replaced by the second data. In such examples, the data manager 820 may be configured to transfer the dirty information from the volatile memory to a register (e.g., the register 258, the register 350) in the interface controller based at least in part on transferring the data, where the dirty information is transferred before the dirty information is updated.

In some examples, the dirty information is or included a single dirty bit in a plurality of dirty bits. In such examples, the dirty information update manager 830 may be configured to update the dirty information by performing a masked write operation in which a subset of the plurality of dirty bits in the volatile memory are modified and the remaining dirty bits are maintained.

In some examples, the validity information is or includes a validity bit included in a set of validity bits stored in a set of memory cells in the array. In such examples, the association manager 835 may be configured to determine an association between each memory cell of the set of memory cells and a respective set of volatile memory cells for storing data in the volatile memory. In some examples, the dirty information is or includes a dirty bit included in a set of dirty bits stored in a second set of volatile memory cells in the volatile memory that are reserved for storing the dirty information. In such examples, the association manager may be configured to determine an association between each memory cell of the second set of volatile memory cells and a respective set of volatile memory cells reserved for storing data in the volatile memory.

In some examples, the data manager 820 may be configured to receive a command (e.g., a write command) to store second data in a set of non-volatile memory cells in the non-volatile memory. The data manager 820 may also be configured to determine, based at least in part on the validity information in the array, that the data stored in the set of volatile memory cells was not previously written to the set of volatile memory cells. The data manager 820 may also be configured to replace the data in the set of volatile memory cells with the second data based at least in part on determining that the data stored in the set of volatile memory cells was not previously written to the set of volatile memory cells.

In some examples, the data manager 820 is configured to receive a command (e.g., a read command) to retrieve data from a set of non-volatile memory cells in the non-volatile memory. The data manager 820 may also be configured to determine, based at least in part on the validity information, that the data stored in the set of volatile memory cells was previously written to the set of volatile memory cells. The data manager 820 may also be configured to retrieve the data from the set of volatile memory cells based at least in part on determining that the data stored in the set of volatile memory cells was previously written to the set of volatile memory cells.

In some examples, the data manager 820 is configured to determine, based at least in part on the dirty information, that the data stored in the set of volatile memory cells is absent from the non-volatile memory or inconsistent with corresponding data in the non-volatile memory. The data manager 820 may also be configured to transfer the data from the set of volatile memory cells to the non-volatile memory based at least in part determining that the data stored in the set of volatile memory cells is absent from the non-volatile memory or inconsistent with corresponding data in the non-volatile memory.

As noted, the memory subsystem 805 may be configured to manage cache metadata as described herein. In a second example, the data manager 820 may be configured to receive, from a host device coupled with the memory subsystem 805, an access command (e.g., a read command, a write command) associated with a portion of the non-volatile memory. The validity information manager 810 may be configured to transfer, based at least in part on the access command, validity information from an array (e.g., the array 254, the subarray 330) in the interface controller to a first register (e.g., the register 256, the register 345) in the interface controller, the validity information indicating whether data stored in a portion of the volatile memory was previously written to the portion of the volatile memory in response to a previous access command from the host device. The dirty information manager 815 may be configured to transfer, based at least in part on the access command, dirty information from the volatile memory to the first register, the dirty information indicating whether the data stored in the portion of the volatile memory is absent from the non-volatile memory or inconsistent with corresponding data in the non-volatile memory.

The data manager 820 may be configured to store, based at least in part on the access command, second data in the portion of the volatile memory. The validity information update manager 825 may be configured to perform a masked write operation, based at least in part on accessing the portion of the volatile memory, to replace the validity information with second validity information.

The data manager 820 may be configured to transfer, based at least in part on the access command, the data stored in the portion of the volatile memory to a buffer (e.g., the buffer 135-b, the buffer 220) in the interface controller. The dirty information update manager 830 may be configured to perform a masked write operation, based at least in part on transferring the data, to replace the dirty information with second dirty information.

The association manager 835 may be configured to determine an association between the portion of the volatile memory and a first memory cell storing the validity information in the array. The association manager 835 may be configured to determine an association between the portion of the volatile memory and a second memory cell storing the dirty information in the volatile memory.

The data manager 820 may be configured to transfer, based at least in part on the validity information, the data stored in the portion of the volatile memory to a buffer (e.g., the buffer 135-b, the buffer 220). The dirty information manager 815 may be configured to transfer the dirty information to a second register based at least in part on transferring the data to the buffer. The data manager 820 may be configured to transfer a subset of the data from the buffer to the non-volatile memory based at least in part on transferring the dirty information to the second register.

When the access command is a storage command (e.g., a write command), the data manager 820 may be configured to determine, based at least in part on the validity information, that the data stored in the portion of the volatile memory was previously written to the portion of the volatile memory, where the data is transferred to the buffer based at least in part on the determination. The data manager 820 may also be configured to store the second data in the portion of the volatile memory after transferring the data from the volatile memory to the buffer.

When the access command is a retrieval command (e.g., a read command), the data manager 820 may be configured to determine that the volatile memory does not store data associated with the retrieval command. The data manager 820 may also be configured to store, based at least in part on the determination, the data associated with the retrieval command in the portion of the volatile memory after transferring the data from the volatile memory to the buffer.

Figure 9:
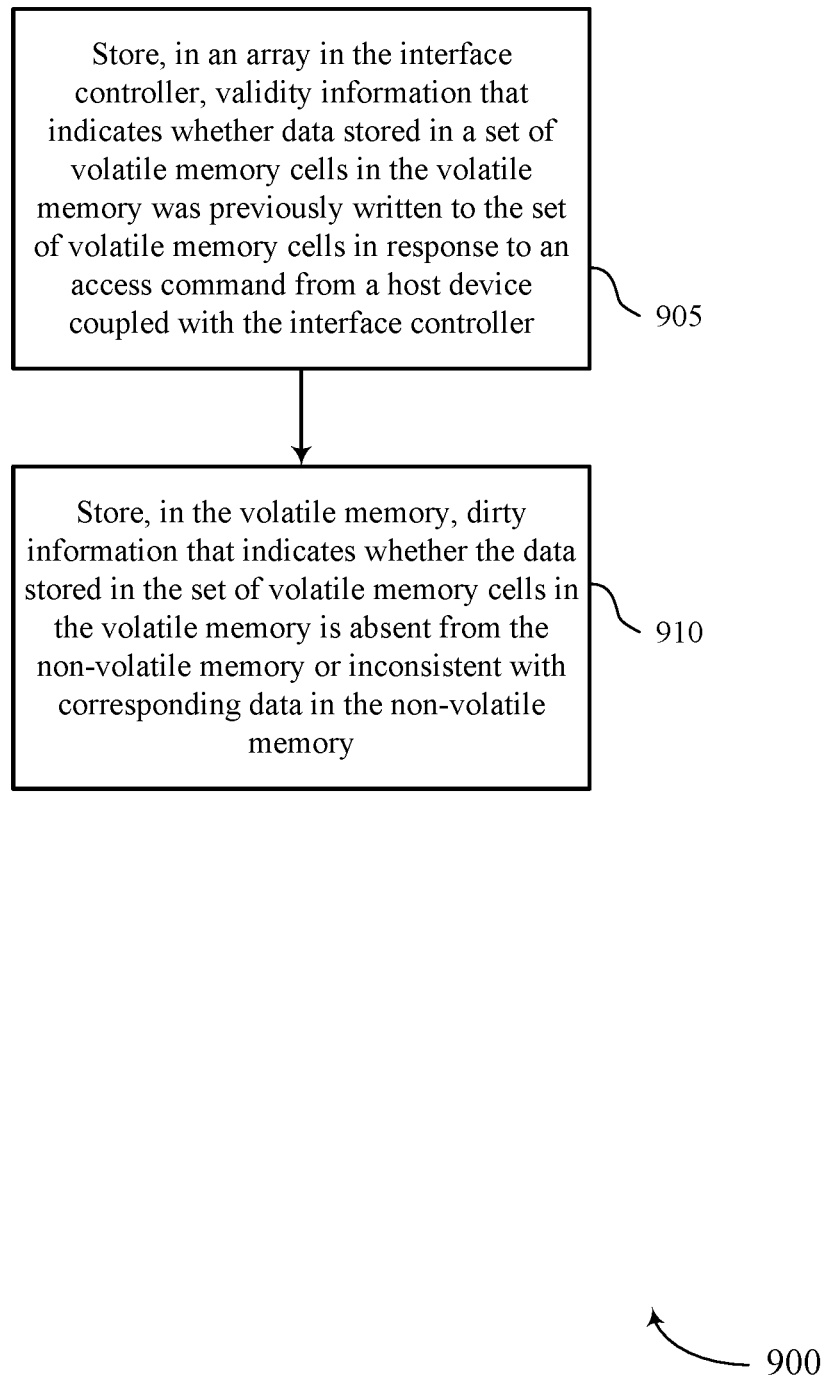
FIGS. 9 and 10 show flowcharts illustrating a method or methods that support cache management in a memory subsystem in accordance with examples as disclosed herein.

FIG. 9 shows a flowchart illustrating a method or methods 900 that supports cache metadata management in accordance with aspects of the present disclosure. The operations of method 900 may be implemented by a memory subsystem or its components as described herein. For example, the operations of method 900 may be performed by a memory subsystem as described with reference to FIGS. 1 through 3. In some examples, a memory subsystem may execute a set of instructions to control the functional elements of the memory subsystem to perform the described functions. Additionally or alternatively, a memory subsystem may perform aspects of the described functions using special-purpose hardware.

In some examples, the operations of method 900 may be implemented by an apparatus that includes a non-volatile memory, a volatile memory, an interface controller coupled with the non-volatile memory and the volatile memory.

At 905, the method may include storing, in an array in the interface controller, validity information that indicates whether data stored in a set of volatile memory cells in the volatile memory was previously written to the set of volatile memory cells in response to an access command from a host device coupled with the interface controller. The operations of 905 may be performed according to the methods described herein. In some examples, aspects of the operations of 905 may be performed by a validity information manager as described with reference to FIG. 8.

At 910, the method may include storing, in the volatile memory, dirty information that indicates whether the data stored in the set of volatile memory cells in the volatile memory is absent from the non-volatile memory or inconsistent with corresponding data in the non-volatile memory. The operations of 910 may be performed according to the methods described herein. In some examples, aspects of the operations of 910 may be performed by a dirty information manager as described with reference to FIG. 8.

In some examples, an apparatus as described herein may perform a method or methods, such as the method 900. The apparatus may include features, means, or instructions (e.g., a non-transitory computer-readable medium storing instructions executable by a processor) for storing, in an array in the interface controller, validity information that indicates whether data stored in a set of volatile memory cells in the volatile memory was previously written to the set of volatile memory cells in response to an access command from a host device coupled with the interface controller; and storing, in the volatile memory, dirty information that indicates whether the data stored in the set of volatile memory cells in the volatile memory is absent from the non-volatile memory or inconsistent with corresponding data in the non-volatile memory.

Some examples of the method 900 and the apparatus described herein may further include operations, features, means, or instructions for transferring the validity information from the array to a first register based at least in part on an access command from the host device; and transfer the dirty information from the volatile memory to a second register based at least in part on transferring the data stored in the set of volatile memory cells to a buffer.

Some examples of the method 900 and the apparatus described herein may further include operations, features, means, or instructions for replacing the data stored in the set of volatile memory cells with second data; and updating the validity information for the set of volatile memory cells based at least in part on replacing the data with the second data.

In some examples, the validity information includes a single validity bit of a plurality of validity bits. In such examples, the method 900 and the apparatus described herein may further include operations, features, means, or instructions for performing a masked write operation in which a subset of the plurality of validity bits in the array are modified and remaining validity bits are maintained, where the validity information is updated based at least in part on the masked write operation.

Some examples of the method 900 and the apparatus described herein may further include operations, features, means, or instructions for replacing the data stored in the set of volatile memory cells with second data; and updating the dirty information for the set of volatile memory cells based at least in part on replacing the data with the second data. Some examples of the method 900 and the apparatus described herein may further include operations, features, means, or instructions for transferring, to a buffer in the interface controller, the data stored in the set of volatile memory cells before the data is replaced by the second data; and transferring the dirty information from the volatile memory to a register in the interface controller based at least in part on transferring the data, where the dirty information is transferred before the dirty information is updated.

In some examples, the dirty information includes a single dirty bit in a plurality of dirty bits. In such examples, the method 900 and the apparatus described herein may further include operations, features, means, or instructions for performing a masked write operation in which a subset of the plurality of dirty bits in the volatile memory are modified and the remaining dirty bits are maintained, wherein the dirty information is updated based at least in part on the masked write operation.

In some examples, the validity information includes a validity bit included in a set of validity bits stored in a set of memory cells in the array. In such examples, the method 900 and the apparatus described herein may further include operations, features, means, or instructions for determining an association between each memory cell of the set of memory cells and a respective set of volatile memory cells for storing data in the volatile memory.

In some examples, the dirty information comprises a dirty bit included in a set of dirty bits stored in a second set of volatile memory cells in the volatile memory that are reserved for storing the dirty information. In such examples, the method 900 and the apparatus described herein may further include operations, features, means, or instructions for determining an association between each memory cell of the second set of volatile memory cells and a respective set of volatile memory cells reserved for storing data in the volatile memory.

Some examples of the method 900 and the apparatus described herein may further include operations, features, means, or instructions for receiving a command to store second data in a set of non-volatile memory cells in the non-volatile memory; determining, based at least in part on the validity information in the array, that the data stored in the set of volatile memory cells was not previously written to the set of volatile memory cells; and replacing the data in the set of volatile memory cells with the second data based at least in part on determining that the data stored in the set of volatile memory cells was not previously written to the set of volatile memory cells.

Some examples of the method 900 and the apparatus described herein may further include operations, features, means, or instructions for receiving a command to retrieve data from a set of non-volatile memory cells in the non-volatile memory; determining, based at least in part on the validity information, that the data stored in the set of volatile memory cells was previously written to the set of volatile memory cells; and retrieving the data from the set of volatile memory cells based at least in part on determining that the data stored in the set of volatile memory cells was previously written to the set of volatile memory cells.

Some examples of the method 900 and the apparatus described herein may further include operations, features, means, or instructions for determining, based at least in part on the dirty information, that the data stored in the set of volatile memory cells is absent from the non-volatile memory or inconsistent with corresponding data in the non-volatile memory; and transferring the data from the set of volatile memory cells to the non-volatile memory based at least in part determining that the data stored in the set of volatile memory cells is absent from the non-volatile memory or inconsistent with corresponding data in the non-volatile memory.

Figure 10:
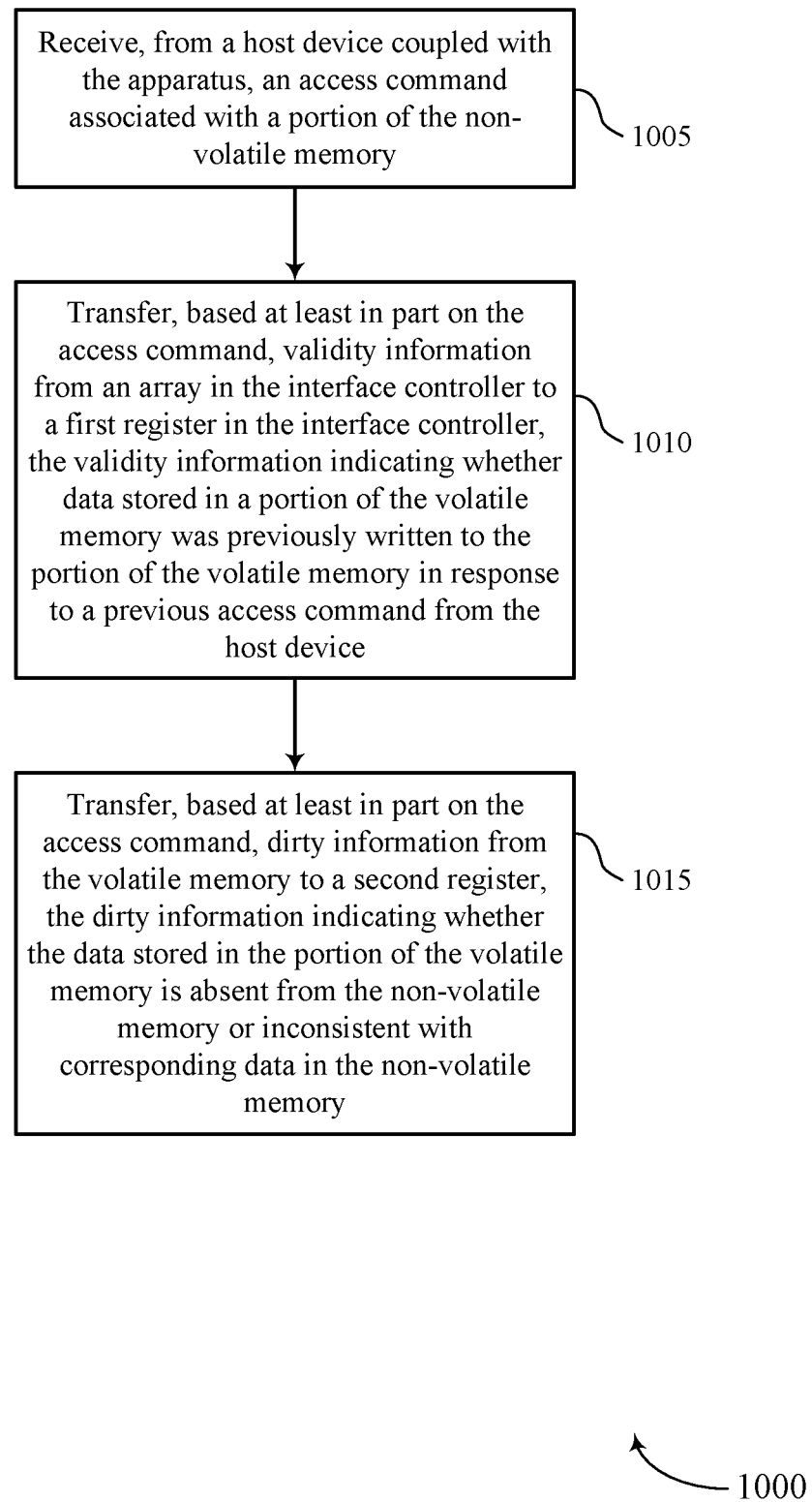

FIG. 10 shows a flowchart illustrating a method or methods 1000 that supports cache metadata management in accordance with aspects of the present disclosure. The operations of method 1000 may be implemented by a memory subsystem or its components as described herein. For example, the operations of method 1000 may be performed by a memory subsystem as described with reference to FIGS. 1 through 3. In some examples, a memory subsystem may execute a set of instructions to control the functional elements of the memory subsystem to perform the described functions. Additionally or alternatively, a memory subsystem may perform aspects of the described functions using special-purpose hardware.

In some examples, the operations of method 1000 may be implemented by an apparatus that includes an interface controller coupled with a non-volatile memory and a volatile memory.

At 1005, the method may include receiving, from a host device coupled with the apparatus, an access command associated with a portion of the non-volatile memory. The operations of 1005 may be performed according to the methods described herein. In some examples, aspects of the operations of 1005 may be performed by a data manager as described with reference to FIG. 8.

At 1010, the method may include transferring, based at least in part on the access command, validity information from an array in the interface controller to a first register in the interface controller, the validity information indicating whether data stored in a portion of the volatile memory was previously written to the portion of the volatile memory in response to a previous access command from the host device. The operations of 1010 may be performed according to the methods described herein. In some examples, aspects of the operations of 1010 may be performed by a validity information manager as described with reference to FIG. 8.

At 1015, the method may include transferring, based at least in part on the access command, dirty information from the volatile memory to the register, the dirty information indicating whether the data stored in the portion of the volatile memory is absent from the non-volatile memory or inconsistent with corresponding data in the non-volatile memory. The operations of 1015 may be performed according to the methods described herein. In some examples, aspects of the operations of 1015 may be performed by a dirty information manager as described with reference to FIG. 8.

In some examples, an apparatus as described herein may perform a method or methods, such as the method 1000. The apparatus may include features, means, or instructions (e.g., a non-transitory computer-readable medium storing instructions executable by a processor) for receiving, from a host device coupled with the apparatus, an access command associated with a portion of the non-volatile memory; transferring, based at least in part on the access command, validity information from an array in the interface controller to a first register in the interface controller, the validity information indicating whether data stored in a portion of the volatile memory was previously written to the portion of the volatile memory in response to a previous access command from the host device; and transfer, based at least in part on the access command, dirty information from the volatile memory to the register, the dirty information indicating whether the data stored in the portion of the volatile memory is absent from the non-volatile memory or inconsistent with corresponding data in the non-volatile memory.

Some examples of the method 1000 and the apparatus described herein may further include operations, features, means, or instructions for storing, based at least in part on the access command, second data in the portion of the volatile memory; and performing a masked write operation, based at least in part on accessing the portion of the volatile memory, to replace the validity information with second validity information.

Some examples of the method 1000 and the apparatus described herein may further include operations, features, means, or instructions for transferring, based at least in part on the access command, the data stored in the portion of the volatile memory to a buffer in the interface controller; and performing a masked write operation, based at least in part on transferring the data, to replace the dirty information with second dirty information.

Some examples of the method 1000 and the apparatus described herein may further include operations, features, means, or instructions for determining an association between the portion of the volatile memory and a first memory cell storing the validity information in the array; and determining an association between the portion of the volatile memory and a second memory cell storing the dirty information in the volatile memory.

Some examples of the method 1000 and the apparatus described herein may further include operations, features, means, or instructions for transferring, based at least in part on the validity information, the data stored in the portion of the volatile memory to a buffer, wherein the dirty information is transferred to a second register based at least in part on transferring the data to the buffer. Some examples of the method 1000 and the apparatus described herein may further include operations, features, means, or instructions for transferring a subset of the data from the buffer to the non-volatile memory based at least in part on transferring the dirty information to the second register.

In some examples, the access command is a storage command for second data. In such examples, the method 1000 and the apparatus described herein may further include operations, features, means, or instructions for determining, based at least in part on the validity information, that the data stored in the portion of the volatile memory was previously written to the portion of the volatile memory, wherein the data is transferred to the buffer based at least in part on the determination; and storing the second data in the portion of the volatile memory after transferring the data from the volatile memory to the buffer.

In some examples, the access command is a retrieval command. In such examples, the method 1000 and the apparatus described herein may further include operations, features, means, or instructions for determining that the volatile memory does not store data associated with the retrieval command; and storing, based at least in part on the determination, the data associated with the retrieval command in the portion of the volatile memory after transferring the data from the volatile memory to the buffer.

It should be noted that the methods described above describe possible implementations, and that the operations and the steps may be rearranged or otherwise modified and that other implementations are possible. Furthermore, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

A protocol may define one or more communication procedures and one or more communication parameters supported for use by a device or component. For example, a protocol may define various operations, a timing and a frequency for those operations, a meaning of various commands or signals or both, one or more addressing scheme(s) for one or more memories, a type of communication for which pins are reserved, a size of data handled at various components such as interfaces, a data rate supported by various components such as interfaces, or a bandwidth supported by various components such as interfaces, among other parameters and metrics, or any combination thereof. Use of a shared protocol may enable interaction between devices because each device may operate in a manner expected, recognized, and understood by another device. For example, two devices that support the same protocol may interact according to the policies, procedures, and parameters defined by the protocol, whereas two devices that support different protocols may be incompatible.

To illustrate, two devices that support different protocols may be incompatible because the protocols define different addressing schemes (e.g., different quantities of address bits). As another illustration, two devices that support different protocols may be incompatible because the protocols define different transfer procedures for responding to a single command (e.g., the burst length or quantity of bytes permitted in response to the command may differ). Merely translating a command to an action should not be construed as use of two different protocols. Rather, two protocols may be considered different if corresponding procedures or parameters defined by the protocols vary. For example, a device may be said to support two different protocols if the device supports different addressing schemes, or different transfer procedures for responding to a command.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
    a non-volatile memory;
    a volatile memory; and
    an interface controller coupled with the non-volatile memory and the volatile memory, the interface controller operable to cause the apparatus to:
        store, in an array in the interface controller that has lower access latency than the volatile memory, validity information for data in a set of volatile memory cells in volatile memory that indicates whether the data is invalid data or valid data, wherein valid data comprises data previously written to the set of volatile memory cells in response to an access command from a host device coupled with the interface controller; and
        store, in the volatile memory outside of the interface controller, dirty information for the data in the set of volatile memory cells that indicates whether the data is absent from the non-volatile memory or inconsistent with corresponding data in the non-volatile memory.

2. The apparatus of claim 1, wherein the interface controller is operable to cause the apparatus to:
    transfer the validity information from the array to a first register based at least in part on the access command from the host device; and
    transfer the dirty information from the volatile memory to a second register based at least in part on transferring the data stored in the set of volatile memory cells to a buffer.

3. The apparatus of claim 1, wherein the interface controller is operable to cause the apparatus to:
    replace the data stored in the set of volatile memory cells with second data; and
    update the validity information for the set of volatile memory cells based at least in part on replacing the data with the second data.

4. The apparatus of claim 3, wherein the validity information comprises a single validity bit of a plurality of validity bits, and wherein the interface controller is operable to cause the apparatus to:
    perform a masked write operation in which a subset of the plurality of validity bits in the array are modified and remaining validity bits are maintained, wherein the validity information is updated based at least in part on the masked write operation.

5. The apparatus of claim 1, wherein the interface controller is operable to cause the apparatus to:
    replace the data stored in the set of volatile memory cells with second data; and
    update the dirty information for the set of volatile memory cells based at least in part on replacing the data with the second data.

6. The apparatus of claim 5, wherein the interface controller is operable to cause the apparatus to:
    transfer, to a buffer in the interface controller, the data stored in the set of volatile memory cells before the data is replaced by the second data; and
    transfer the dirty information from the volatile memory to a register in the interface controller based at least in part on transferring the data, wherein the dirty information is transferred before the dirty information is updated.

7. The apparatus of claim 5, wherein the dirty information comprises a single dirty bit in a plurality of dirty bits, and wherein the interface controller is operable to cause the apparatus to:
    perform a masked write operation in which a subset of the plurality of dirty bits in the volatile memory are modified and remaining dirty bits are maintained, wherein the dirty information is updated based at least in part on the masked write operation.

8. The apparatus of claim 1, wherein the validity information comprises a validity bit included in a set of validity bits stored in a set of memory cells in the array, and wherein the interface controller is operable to cause the apparatus to:
    determine an association between each memory cell of the set of memory cells and a respective set of volatile memory cells for storing data in the volatile memory.

9. The apparatus of claim 1, wherein the dirty information comprises a dirty bit included in a set of dirty bits stored in a second set of volatile memory cells in the volatile memory that are reserved for storing the dirty information, and wherein the interface controller is operable to cause the apparatus to:
    determine an association between each memory cell of the second set of volatile memory cells and a respective set of volatile memory cells reserved for storing data in the volatile memory.

10. The apparatus of claim 1, wherein the interface controller is operable to cause the apparatus to:
    receive a command to store second data in a set of non-volatile memory cells in the non-volatile memory;

determine, based at least in part on the validity information in the array, that the data stored in the set of volatile memory cells was not previously written to the set of volatile memory cells; and replace the data in the set of volatile memory cells with the second data based at least in part on determining that the data stored in the set of volatile memory cells was not previously written to the set of volatile memory cells.

11. The apparatus of claim 1, wherein the interface controller is operable to cause the apparatus to:
   receive a command to retrieve data from a set of non-volatile memory cells in the non-volatile memory;
   determine, based at least in part on the validity information, that the data stored in the set of volatile memory cells was previously written to the set of volatile memory cells; and
   retrieve the data from the set of volatile memory cells based at least in part on determining that the data stored in the set of volatile memory cells was previously written to the set of volatile memory cells.

12. The apparatus of claim 11, wherein the interface controller is operable to cause the apparatus to:
   determine, based at least in part on the dirty information, that the data stored in the set of volatile memory cells is absent from the non-volatile memory or inconsistent with the corresponding data in the non-volatile memory; and
   transfer the data from the set of volatile memory cells to the non-volatile memory based at least in part determining that the data stored in the set of volatile memory cells is absent from the non-volatile memory or inconsistent with the corresponding data in the non-volatile memory.

13. An apparatus, comprising:
   an interface controller coupled with a non-volatile memory and a volatile memory, the interface controller operable to cause the apparatus to:
      receive, from a host device coupled with the apparatus, an access command associated with a portion of the non-volatile memory;
      transfer, based at least in part on the access command, validity information from an array in the interface controller to a register in the interface controller, the validity information indicating whether data stored in a portion of the volatile memory was previously written to the portion of the volatile memory in response to a previous access command from the host device; and
      transfer, based at least in part on the access command, dirty information from the volatile memory to the register, the dirty information indicating whether the data stored in the portion of the volatile memory is absent from the non-volatile memory or inconsistent with corresponding data in the non-volatile memory.

14. The apparatus of claim 13, wherein the interface controller is operable to cause the apparatus to:
   store, based at least in part on the access command, second data in the portion of the volatile memory; and
   perform a masked write operation, based at least in part on accessing the portion of the volatile memory, to replace the validity information with second validity information.

15. The apparatus of claim 13, wherein the interface controller is operable to cause the apparatus to:
   transfer, based at least in part on the access command, the data stored in the portion of the volatile memory to a buffer in the interface controller; and
   perform a masked write operation, based at least in part on transferring the data, to replace the dirty information with second dirty information.

16. The apparatus of claim 13, wherein the interface controller is operable to cause the apparatus to:
   determine an association between the portion of the volatile memory and a first memory cell storing the validity information in the array; and
   determine an association between the portion of the volatile memory and a second memory cell storing the dirty information in the volatile memory.

17. The apparatus of claim 13, and wherein the interface controller is operable to cause the apparatus to:
   transfer, based at least in part on the validity information, the data stored in the portion of the volatile memory to a buffer; and
   transfer the dirty information to a second register based at least in part on transferring the data to the buffer.

18. The apparatus of claim 17, wherein the interface controller is operable to cause the apparatus to:
   transfer a subset of the data from the buffer to the non-volatile memory based at least in part on transferring the dirty information to the second register.

19. The apparatus of claim 17, wherein the access command comprises a storage command for second data, and wherein the interface controller is operable to cause the apparatus to:
   determine, based at least in part on the validity information, that the data stored in the portion of the volatile memory was previously written to the portion of the volatile memory, wherein the data is transferred to the buffer based at least in part on the determination; and
   store the second data in the portion of the volatile memory after transferring the data from the volatile memory to the buffer.

20. The apparatus of claim 17, wherein the access command comprises a retrieval command, and wherein the interface controller is operable to cause the apparatus to:
   determine that the volatile memory does not store data associated with the retrieval command; and
   store, based at least in part on the determination, the data associated with the retrieval command in the portion of the volatile memory after transferring the data from the volatile memory to the buffer.

21. A method, comprising:
   storing, in an array in an interface controller that has lower access latency than a volatile memory, validity information for data in a set of volatile memory cells in the volatile memory that indicates whether the data is invalid data or valid data, wherein valid data comprises data previously written to the set of volatile memory cells in response to an access command from a host device coupled with the interface controller; and
   storing, in the volatile memory, dirty information for the data in the set of volatile memory cells that indicates whether the data is absent from a non-volatile memory coupled with the interface controller or inconsistent with corresponding data in the non-volatile memory.

22. The method of claim 21, further comprising:
   transferring the validity information from the array to a register based at least in part on the access command from the host device; and transferring the dirty information from the volatile memory to the register based at least in part on transferring the data stored in the set of volatile memory cells to a buffer.

23. The method of claim 21, further comprising:
replacing the data stored in the set of volatile memory cells with second data; and
updating the validity information for the set of volatile memory cells based at least in part on replacing the data with the second data.

24. The method of claim 23, wherein the validity information comprises a single validity bit of a plurality of validity bits, and wherein the method further comprises:
performing a masked write operation in which a subset of the plurality of validity bits in the array are modified and remaining validity bits are maintained, wherein the validity information is updated based at least in part on the masked write operation.

25. The method of claim 21, further comprising:
replacing the data stored in the set of volatile memory cells with second data; and
updating the dirty information for the set of volatile memory cells based at least in part on replacing the data with the second data.

* * * * *